United States Patent
Kim et al.

(10) Patent No.: US 11,902,495 B2
(45) Date of Patent: Feb. 13, 2024

(54) ULTRAFAST CAMERA SYSTEM AND MEASUREMENT METHOD THEREOF

(71) Applicant: KOREA ADVANCED INSTITUTE OF SCIENCE AND TECHNOLOGY, Daejeon (KR)

(72) Inventors: Jungwon Kim, Daejeon (KR); Yongjin Na, Daejeon (KR); Hyunsoo Kwak, Daejeon (KR); Changmin Ahn, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 270 days.

(21) Appl. No.: 17/333,153

(22) Filed: May 28, 2021

(65) Prior Publication Data

US 2021/0377511 A1   Dec. 2, 2021

(30) Foreign Application Priority Data

Jun. 2, 2020 (KR) .................. 10-2020-0066273
Dec. 28, 2020 (KR) .................. 10-2020-0185102

(51) Int. Cl.
  *H04N 13/25* (2018.01)
  *H04N 13/257* (2018.01)
  *G01S 7/4861* (2020.01)
  *G01S 17/894* (2020.01)

(52) U.S. Cl.
  CPC ......... *H04N 13/257* (2018.05); *G01S 7/4861* (2013.01); *G01S 17/894* (2020.01)

(58) Field of Classification Search
  CPC .... H04N 13/257; G01S 17/894; G01S 7/4861
  See application file for complete search history.

(56) References Cited

FOREIGN PATENT DOCUMENTS

| JP | 2018-518836 | 7/2018 |
|----|-------------|--------|
| JP | 2019-158737 | 9/2019 |

(Continued)

OTHER PUBLICATIONS

Yongjin Na et al., "Ultrafast, sub-nanometre-precision and multi-functional time-of-flight detection", nature photonics—https://doi.org/10.1038/s41566-020-0586-0, Feb. 10, 2020.

(Continued)

*Primary Examiner* — Twyler L Haskins
*Assistant Examiner* — Fayez A Bhuiyan
(74) *Attorney, Agent, or Firm* — LEX IP MEISTER, PLLC

(57) ABSTRACT

An ultrafast camera system includes a sensor head that injects an optical pulse train input from a pulsed laser onto a surface of a measurement target and outputs an optical signal reflected from the surface, and a timing detector that receives the optical signal whose time-of-flight is changed after passing through the sensor head and outputs an electrical signal corresponding to a timing error between the optical signal and a reference signal. Another ultrafast camera system includes a wavelength dispersion device to disperse an optical pulse train of a pulsed laser into a wavelength spectrum, a lens that vertically injects continuous wavelength signals dispersed into the wavelength spectrum onto a measurement line, and a timing detector that receives an optical signal including the continuous wavelength signals reflected from the measurement line, and outputs a timing error between the reference signal and the continuous wavelength signals as a signal intensity.

18 Claims, 22 Drawing Sheets

(56) References Cited

FOREIGN PATENT DOCUMENTS

| KR | 10-1331980 | 11/2013 |
| KR | 10-1866691 | 6/2018 |
| KR | 10-1866691 B1 * | 6/2018 |
| KR | 10-1922046 | 11/2018 |
| KR | 10-2019-0061094 | 6/2019 |
| KR | 10-2010172 | 8/2019 |
| KR | 10-2141705 | 8/2020 |

OTHER PUBLICATIONS

Yongjin Na et al., "Rapid and Precise Displacement Measurement Using Time-of-Flight Detection of Femtosecond Optical Pulses", CLEO: Science and Innovations 2019, From the session Precision Timing & Optical Time Transfer (STh3G), May 5-10, 2019.

Xing Lu et al., "Time-of-flight detection of femtosecond laser pulses for precise measurement of large microelectronic step height", Optics Letters vol. 43, No. 7, p. 1447-1450, Mar. 19, 2018.

Y. Na, C. G. Jeon, C. Ahn, M. Hyun, D. Kwon, J. Shin, and J. Kim, "Ultrafast, sub-nanometre-precision and multifunctional time-of-flight detection," Nature Photonics 1-6, Feb. 10, 2020.

Yongjin Na et al., "Precise and large-dynamic-range surface profilometry using time-of-flight detection of femtosecond optical pulses" Proc. SPIE vol. 10909, Laser 3D Manufacturing VI, 1090916 ; doi: 10.1117/12.2508242, Mar. 4, 2019.

Chao Wang et al., "Line-scan spectrum-encoded imaging by dual-comb interferometry," Optics Letters vol. 43, No. 7, 1606-1609, Mar. 29, 2018.

* cited by examiner

Two dimensional

ULTRAFAST CAMERA SYSTEM AND MEASUREMENT METHOD THEREOF

CROSS-REFERENCE TO RELATED APPLICATION

This application claims priority to and the benefit of Korean Patent Application No. 10-2020-0066273 filed in the Korean Intellectual Property Office on Jun. 2, 2020, and Korean Patent Application No. 10-2020-0185102 filed in the Korean Intellectual Property Office on Dec. 28, 2020, the entire contents of which are incorporated herein by reference.

BACKGROUND

(a) Field

The present disclosure relates to detection of time-of-flight (TOF) of optical pulses.

(b) Description of the Related Art

Laser-based displacement measurement technology is widely used in various technical fields. Important performance parameters in displacement measurement are precision, measurement speed, and non-ambiguity range (NAR). However, performance improvement of one parameter usually leads to performance deterioration of other parameters. For example, obtaining high precision may require long time and have a limited detectable range.

Meanwhile, while having made dramatic advances in precision, various laser-based measurement technologies have a limit in measuring fast, very small, and complicated mechanical movements.

SUMMARY

The present disclosure provides an ultrafast camera system that measures movements or a shape with high speed and high resolution in real time by using an electro-optic sampling based timing detector.

The present disclosure provides an ultrafast camera system that detects timing errors of plural sub-pulses obtained by wavelength division and measures movements or shapes of plural points reflecting the plural sub-pulses with high speed and high resolution in real time.

The present disclosure provides an ultrafast camera system that disperses an optical pulse into a one-dimensional 1D space corresponding to a wavelength spectrum, transfers the dispersed optical pulse to a measurement target, detects spectrum signal intensity of a reflected optical pulse, and measures movements or a shape of a measurement line with high speed and high resolution in real time.

The present disclosure provides an ultrafast camera system to image a three-dimensional shape.

An ultrafast camera system according to an embodiment includes a sensor head that injects an optical pulse train input from a pulsed laser onto a surface of a measurement target and outputs an optical signal reflected from the surface, and a timing detector that receives the optical signal whose time-of-flight is changed after passing through the sensor head and outputs an electrical signal corresponding to a timing error between the optical signal and a reference signal.

Through a beam scanner disposed in an optical path, the sensor head may perform high speed scanning of the input optical pulse train, inject the optical pulse train to plural points of the measurement target, and output the optical signal reflected from the plural points.

Through a wavelength division multiplexer displaced in an optical path, the sensor head may generate sub-pulses by performing wavelength division on the input optical pulse train, inject the sub-pulses into different points of the measurement target, and output the optical signal obtained through multiplexing the sub-pulses reflected from the different points.

The timing detector may modulate the optical signal using the reference signal in a loop where the input optical signal is divided and then the divided signals circulate in different directions, wavelength-divide each of two interference signals generated from interference of the signals circulating the loop into corresponding channels, and output the electrical signal corresponding to a timing error of each sub-pulse via a balanced photodetector for each channel.

The sensor head may generate sub-pulses by wavelength-dividing the input optical pulse train, disperse the sub-pulses at an angle corresponding to wavelength using a wavelength dispersion device to inject the dispersed sub-pulses onto different points of the measurement target, and output the optical signal obtained by multiplexing the sub-pulses reflected from the different points, through a wavelength division multiplexer disposed in an optical path.

The timing detector may modulate the optical signal using the reference signal in a loop where the optical signal is divided and then the divided signals circulate in different directions, and obtain an intensity difference of two interference signals which are generated from interference between the signals circulating the loop through balanced photodetection. The intensity difference of the two interference signals may be an electrical signal proportional to a timing error between the optical signal and the reference signal.

The timing detector may be implemented with a fiber loop-based optical-microwave phase detector (FLOM-PD), a 3×3 coupler-based phase detector, or a balanced optical-microwave phase detector (BOM-PD).

The ultra-high speed camera system may further include a reference signal source to output the reference signal synchronized with the pulsed laser. The reference signal source may include an electrical pulse generator that generates photocurrent pulses as the reference signal by performing photoelectric transformation on the optical pulse train of the pulsed laser, or a voltage-controlled oscillator that generates a microwave signal as the reference signal. The microwave signal may be frequency-locked by the optical pulse train of the pulsed laser as the reference signal.

The electrical signal output from the timing detector may be proportional to a displacement of the measurement target or time-of-flight change.

An ultrafast camera system according to another embodiment includes a wavelength division multiplexer that generates sub-pulses by wavelength-dividing an optical pulse train output from a pulsed laser, collimators that inject the sub-pulses onto points of a measurement target and transmit the sub-pulses reflected from the points to the wavelength division multiplexer, and a timing detector that receives, from the wavelength division multiplexer, an optical signal generated by multiplexing the reflected sub-pulses, and outputs electrical signals corresponding to timing errors of the reference signal and sub-pulses included in the optical signal.

The timing detector may modulate the optical signal using the reference signal in a loop where the input optical signal is divided and then the divided signals circulate in different directions, wavelength-divide each of two interference signals generated from interference of the signals circulating the loop into corresponding channels, and output an electrical signal corresponding to a timing error of each sub-pulse via a balanced photodetector for each channel.

An ultrafast camera system according to yet another embodiment includes a wavelength division multiplexer that generates sub-pulses by wavelength-dividing an optical pulse train output from a pulsed laser, a wavelength dispersion device to disperse the sub-pulses generated by the wavelength division multiplexer, a lens that vertically injects the sub-pulses dispersed at an angle corresponding to the wavelength by the wavelength dispersion device onto a measurement target, and a timing detector that receives an optical signal obtained by multiplexing the sub-pulses reflected from points of the measurement target and outputs electrical signals corresponding to timing errors between the reference signal and sub-pulses included in the optical signal. The sub-pulses reflected from the points on the measurement target may be entered to the timing detector via the lens, the wavelength dispersion device, and the wavelength division multiplexer.

The timing detector may modulate the optical signal using the reference signal in a loop where the optical signal is divided and then the divided signals circulate in different directions, wavelength-divide each of two interference signals generated from interference of the signals circulating the loop into corresponding channels, and output an electrical signal corresponding to a timing error of each sub-pulse via a balanced photodetector for each channel.

An ultrafast camera system according to still another embodiment includes a wavelength dispersion device to disperse an optical pulse train of a pulsed laser into a wavelength spectrum, a lens that vertically injects continuous wavelength signals dispersed into the wavelength spectrum onto a measurement line, and a timing detector that receives an optical signal including the continuous wavelength signals reflected from the measurement line, and outputs a signal intensity in the wavelength spectrum, which is corresponding to a timing error between the reference signal and the continuous wavelength signal. The optical signal including the reflected continuous wavelength signals may be entered to the timing detector via the lens and the wavelength dispersion device.

The timing detector may include a loop interferometer that modulates the optical signal using the reference signal in a loop where the optical signal is divided and the divided signals circulate in different directions, and outputs two interference signals generated from interference between the signals circulating the loop, an optical switch that alternately inputs the two interference signals to a spectrum analyzer, the spectrum analyzer that disperses each interference signal alternately entered from the optical switch into the wavelength spectrum and then measures an intensity of each dispersed continuous wavelength signal, and a computing device that outputs an intensity difference of two measurement signals measured by the spectrum analyzer during a switching period of the optical switch.

The timing detector may include a loop interferometer that modulates the optical signal using the reference signal in a loop where the optical signal is divided and the divided signals circulate in different directions, and outputs two interference signals generated from interference between the signals circulating the loop, an optical switch that alternately inputs a first signal predetermined in the two interference signals and a second signal before being input to the loop interferometer, to a spectrum analyzer, the spectrum analyzer that alternately disperses the first signal and the second signal alternately entered from the optical switch, into the wavelength spectrum and then measures an intensity of the dispersed first signal and the dispersed second signal respectively, and a computing device that calculates an optical power correction value being a ratio of a reference optical power and the intensity of the dispersed second signal measured by the spectrum analyzer, and corrects the intensity of the dispersed first signal with the optical power correction value.

The timing detector may include a loop interferometer that modulates the optical signal using the reference signal in a loop where the optical signal is divided and the divided signals circulate in different directions, and outputs two interference signals generated from interference between the signals circulating the loop, a first spectrum analyzer that receives a first interference signal in the two interference signals, disperses the first interference signal into the wavelength spectrum, and measures an intensity of dispersed continuous wavelength signals, a second spectrum analyzer that receives a second interference signal in the two interference signals, disperses the second interference signal into the wavelength spectrum, and measures an intensity of the dispersed continuous wavelength signals, and a computing device that outputs an intensity difference between two measurement signals measured by the first spectrum analyzer and the second spectrum analyzer.

The timing detector may include a loop interferometer that modulates the optical signal using the reference signal in a loop where the input optical signal is divided and the divided signals circulate in different directions, and outputs two interference signals generated from interference between the signals circulating the loop, a first spectrum analyzer that receives a first signal predetermined in the two interference signals, disperses the first signal into the wavelength spectrum, and measures an intensity of dispersed continuous wavelength signals, a second spectrum analyzer that receives a second signal before being input to the loop interferometer, disperses the second signal into the wavelength spectrum, and measures an intensity of dispersed continuous wavelength signals, and a computing device that calculates an optical power correction value being a ratio between a reference optical power and the intensity measured by the second spectrum analyzer, and corrects the intensity measured by the first spectrum analyzer with the optical power correction value.

The ultra-high-speed camera system may further include a beam scanner to move the measurement line to a direction vertical to the measurement line.

The timing detector may output signal intensities of the measurement lines moved by the beam scanner, and the signal intensities of the measurement lines may be used for the 3D shape imaging of a measurement target.

The timing detector may output the signal intensity in the wavelength spectrum, per measurement line.

The ultra-high speed camera system may further include an electrical pulse generator that generates photocurrent pulses as the reference signal by performing photoelectric transformation on the optical pulse train of the pulsed laser.

The ultra-high speed camera system may further include a voltage-controlled oscillator that generates a microwave signal as the reference signal, which is frequency-locked by the optical pulse train of the pulsed laser.

The timing detector may include at least one spectrum analyzer that disperses each input signal into the wavelength spectrum and then measures an intensity of dispersed continuous wavelength signal. The spectrum analyzer may include a diffraction lattice and a line scan camera.

According to the present disclosure, the movements or shape information of structures, such as a cantilever may be measured with high speed and high resolution in real time.

According to the present disclosure, the movements at plural points and shapes of plural points may be measured at once by using wave-dispersed plural sub-pulses with high speed and high resolution in real time.

According to the present disclosure, it is possible to measure the movement or shape of a line, which the measurement points are continuous, at a high speed, high resolution, and in real time by using the dispersed optical pulses. According to the embodiment, since optical spectrum information dispersed in the line direction can be obtained at once, the movement or shape of a structure can be measured faster than using limited numbers of sub-pulses.

According to the present disclosure, since the movement or shape of a line can be measured at once without any separate beam scanning device, the configuration can be simplified and the mechanical movement be reduced. Thus, the ultrafast camera system may be less sensitive to alignment.

According to the present disclosure, since optical spectrum information can be measured in one-shot, very high speed measurement comparable to repetition rate of a laser can be achieved.

According to the present disclosure, it is possible to measure a 3D shape of a measurement target with high speed and high resolution in real time.

DETAILED DESCRIPTION OF THE EMBODIMENTS

Figure 1:
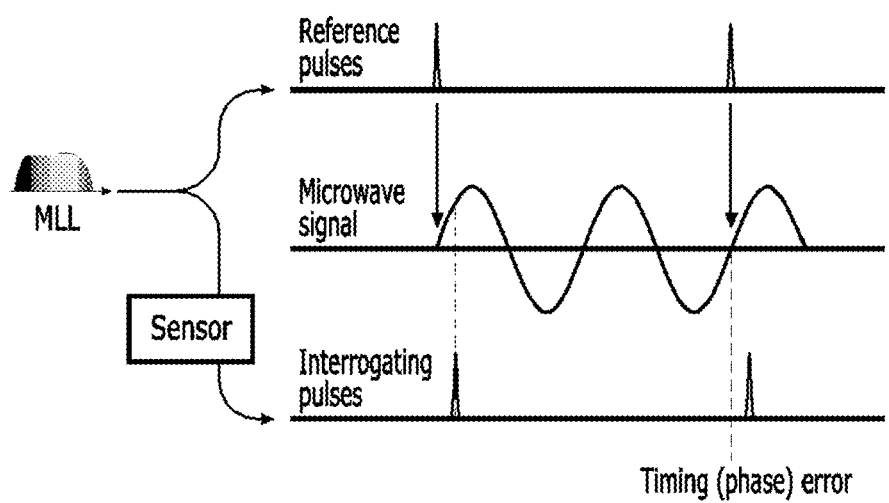
FIG. 1 is a diagram conceptually illustrating a method for detecting time-of-flight of an optical pulse.

Hereinafter, embodiments of the present disclosure will be described in detail with reference to the attached drawings so that the person of ordinary skill in the art may easily implement the present disclosure. However, the present disclosure may be modified in various ways and is not limited to the embodiments described herein. In the drawings, elements irrelevant to the description of the present disclosure are omitted for simplicity of explanation, and like reference numerals designate like elements throughout the specification.

In the description, when a part is referred to "include" a certain element, it means that it may further include other elements rather than exclude other elements, unless specifically indicates otherwise.

In the description, timing error, phase error, and time-of-flight (TOF) change can be used interchangeably. Further, timing error, timing difference, and timing change can be used interchangeably, and also can be briefly referred to as "timing".

In the description, reference numerals and names are given for convenience of explanation, and devices are not strictly limited to the reference numerals or names at all costs.

FIG. 1 is a diagram conceptually illustrating a method for detecting time-of-flight of an optical pulse.

Referring to FIG. 1, time-of-flight of an optical pulse is detected using a reference signal synchronized with a laser. The reference signal is an electrical signal. For example, the reference signal may be an electrical waveform and may be a microwave signal of a voltage-controlled oscillator (VCO) synchronized/frequency-locked with a laser.

Alternatively, the reference signal may be an electrical pulse obtained from photoelectric transformation of an optical pulse or an electric waveform extracted from the electrical pulse. Since the electrical pulse or the electric waveform extracted from the electrical pulse is already synchronized with the pulsed laser, a separate synchronization device is not required.

A timing (phase) error occurs between the reference signal and interrogating pulses whose time-of-flight is changed as passing through a sensor. The timing error due to the time-of-flight change can be measured using an electro-optic sampling based timing detector (EOS-TD). The timing detector may also be referred to as an optical phase detector, and can be implemented in various forms.

Figure 2:
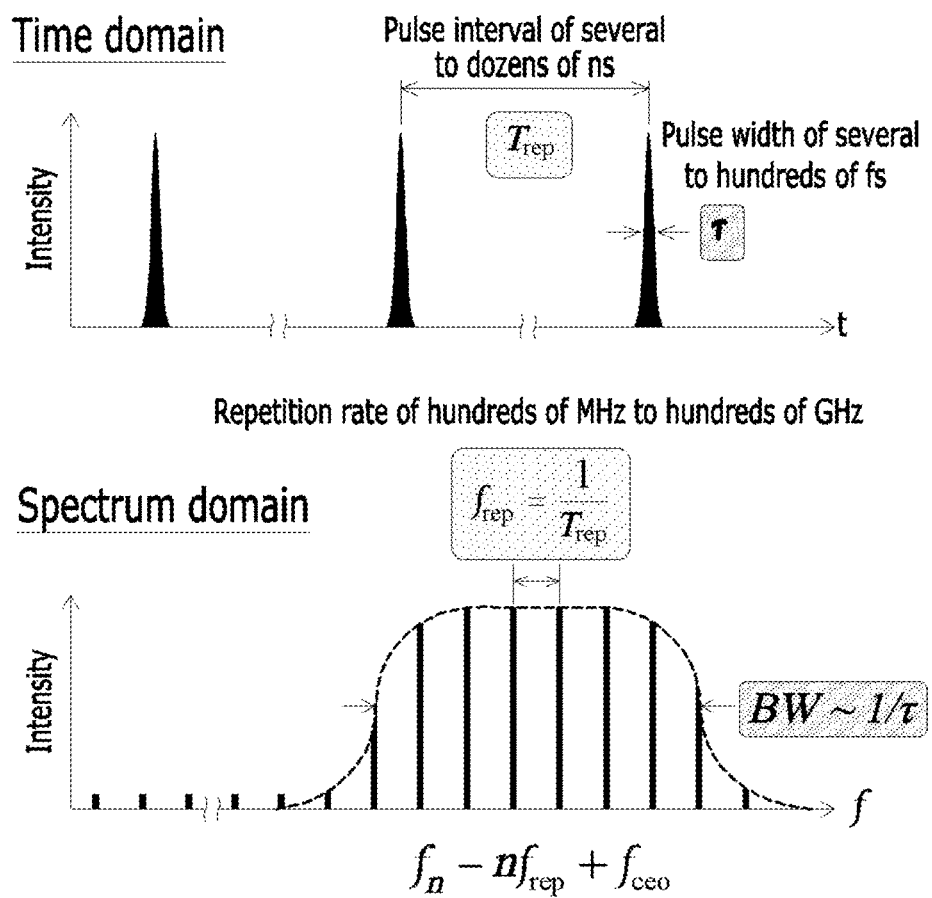
FIG. 2 is a diagram showing time domain and spectrum domain characteristics of a mode-locked laser.

FIG. 2 is a diagram showing time domain and spectrum domain characteristics of a mode-locked laser.

Referring to FIG. 2, a mode-locked laser has excellent time resolution due to a very short pulse width ($\tau$) and low timing jitter, among pulsed lasers. In addition, due to having a wide spectrum, the mode-locked laser can generate multichannel through wavelength division of the wide spectrum or disperse into a wide spectrum. When a pulse train with a time interval between pulses (period, $T_{rep}$) ranging from nanosecond or less to several nanosecond is output, a repetition rate ($f_{rep}$) being a reciprocal number of the period becomes several hundreds of MHz to several GHz.

The optical pulse is divided into a narrow bandwidth in the spectrum domain, and each of the divided sub-pulses can propagate along a designated channel path. In the description, wavelength-divided pulses from the optical pulses are referred to as "sub-pulses".

Figure 3:
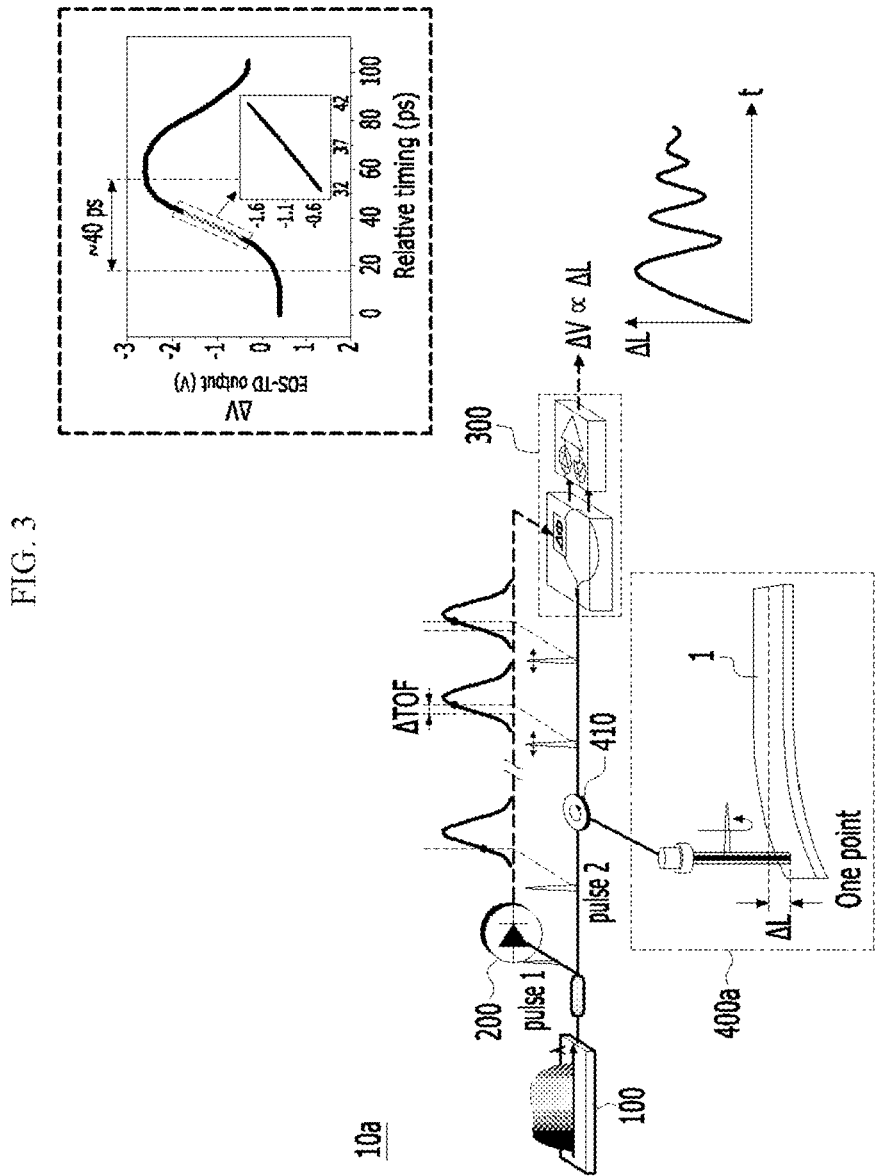
FIG. 3 is a schematic structure diagram of an ultrafast camera system according to an embodiment.

FIG. 3 is a schematic structure diagram of an ultrafast camera system according to an embodiment.

Referring to FIG. 3, an ultrafast camera system 10a measures a movement of a measurement target by using a time-of-flight change in an optical pulse having passed the measurement target. The ultrafast camera system 10a can measure the movement of an incident point of the optical pulse with high speed and high resolution in real time. The movement of the measuring point can be measured as a displacement ΔL of the measuring point. In the drawing, a cantilever is exemplified as a measurement target. However, the measurement target may be various objects, such as a piezoelectric transducer (PZT) and the like. Meanwhile, the ultrafast camera system 10a can measure surface profiles such as step, curvature, and flatness in addition to the movement.

The ultrafast camera system 10a includes a pulsed laser 100, an electrical pulse generator 200, an electro-optic sampling based timing detector (EOS-TD) (briefly refer to as a "timing detector") 300, and a circulator (CL) 410 to which a sensor head (400a) is connected. In the description, the name of "sensor head" is given to distinguish some components included in the ultrafast camera system from other components, and the components are not limited to the name. The ultrafast camera system 10a may include a computing device (not shown) that collects and analyzes data output from the timing detector 300 and transmits the result to outside or displays the result on a screen.

Since the computing device may be implemented independently, details on the computing device are omitted in the description and drawings. An erbium doped fiber amplifier (EDFA), an optical delay line (ODL), and the like may be added to an optical path.

The timing detector 300 may be implemented to have various structures. The timing detector 300 may be implemented with, for example, a fiber loop-based optical-microwave phase detector (FLOM-PD) using a Sagnac loop interferometer, a 3×3 coupler-based phase detector, and a balanced optical-microwave phase detector.

The circulator 410 transmits the input optical pulse to the sensor head 400a, and transmits the optical pulse reflected at the sensor head 400a to the timing detector 300. The sensor head 400a injects the optical pulse transmitted from the circulator 410 to a measurement target 1, and returns the optical pulse reflected from a surface of the measurement target 1 to the circulator 410.

The pulsed laser 100 outputs an optical pulse train. The pulsed laser 100 may be a mode-locked laser (MLL). The pulsed laser 100 may be a femtosecond laser to generate a very short optical pulse of a femtosecond scale, but the type of the laser may be changed. The optical pulse train output from the pulsed laser 100 is divided into a first optical pulse train (Pulse 1) and a second optical pulse train (Pulse 2) by a coupler (not shown). A path can be configured so that the first optical pulse train is input to the electrical pulse generator 200 and the second optical pulse train is input to the timing detector 300 after passing through the sensor head 400a. Here, when a displacement ΔL of the measuring point occurs due to the movement of the measurement target 1, a time-of-flight change ΔTOF of the optical pulse incident on the measurement point occurs.

The electrical pulse generator 200 receives the first optical pulse train (Pulse 1) transmitted from the pulsed laser 100. The electrical pulse generator 200 performs photoelectric transformation on the optical pulse to obtain an electrical pulse train and outputs the obtained electrical pulse train. The electrical pulse may be a photocurrent pulse. The electrical pulse is input to the timing detector 300, and used as a reference signal to detect the time-of-flight change. Here, since being a photoelectrically transformed signal from the optical pulse train of the pulsed laser 100, the electrical pulse is already frequency-synchronized with the repetition rate ($f_{rep}$) of the pulsed laser 100. Meanwhile, instead of the electrical pulse, an electric signal of a sine wave extracted from the electrical pulse may be input to the timing detector 300.

The electrical pulse generator 200 includes a photoelectric device to convert an optical signal into an electric signal (current signal). The types of the photoelectric device may be various. For example, a p-i-n photodiode (PD), a uni-travelling-carrier (UTC)/modified uni-travelling-carrier (MUTC) photodiode, or the like may be used.

The timing detector 300 receives the optical pulse train whose time-of-flight is changed, and receives the electrical pulse train from the electrical pulse generator 200. The timing detector 300 outputs an electrical signal ΔV proportional to a timing error between the optical pulse and the electrical pulse based on electro-optic sampling. The electric signal output from the timing detector 300 is proportional to the displacement ΔL of the measuring point. The timing detector 300 can output the displacement ΔL of the measuring point over time in real time. The timing detector 300 can measure transient or nonlinear mechanical movements in real time.

The timing detector 300 can calculate the timing error between the optical pulse and the electrical pulse, by detecting the relative temporal position of the optical pulse for a specific point of the electrical pulse. At this time, the timing detector 300 can detect a timing of the optical pulse to a rising edge of the electrical pulse, and an arbitrary point of the rising edge may be used as a reference point for detecting a relative time position. Particularly, since linearly usable timing domain is the widest in two directions at the middle point, the middle point of the rising edge may be used as a reference point for error detection.

The electrical signal ΔV being an output of the timing detector 300 can be expressed as a function of the relative time position between the electrical pulse and the optical pulse. When the electrical pulse is a photocurrent pulse extracted from a 22 GHz MUTC photodiode, the optical pulse can linearly sweep to the rising edge of the optical current pulse within 40 ps.

Figure 4:
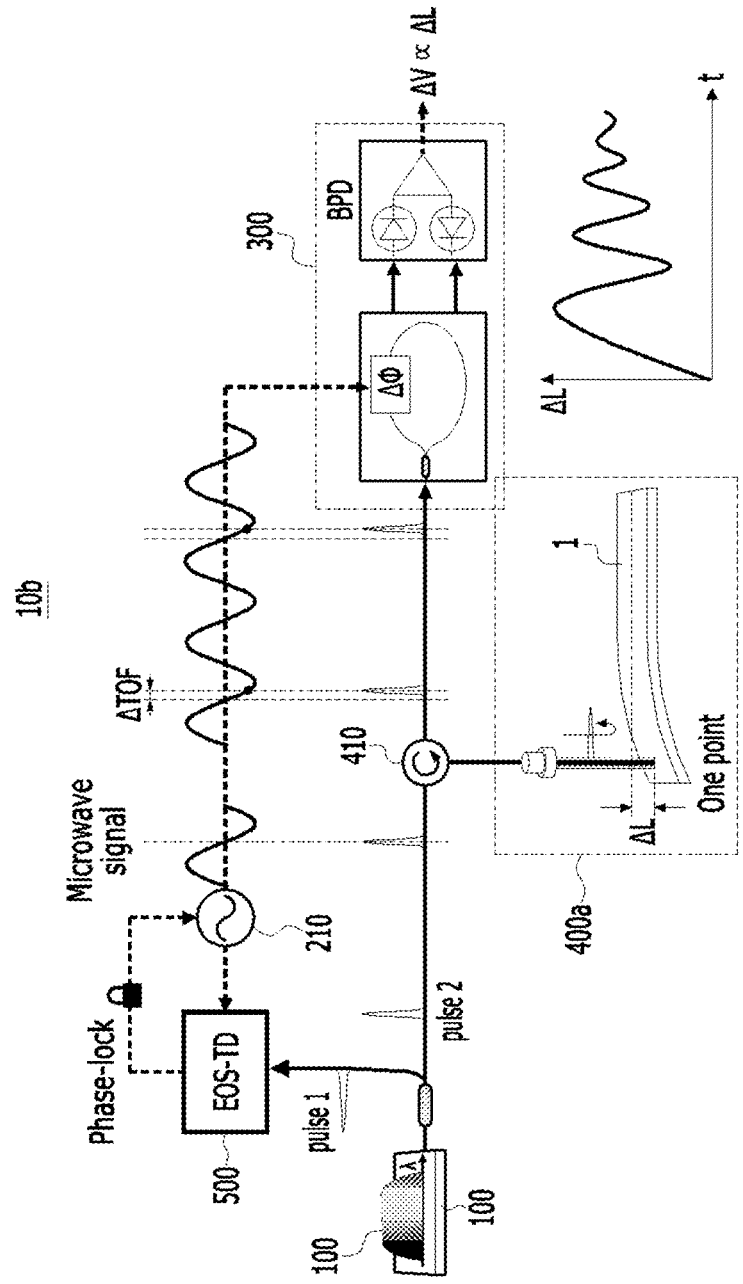
FIG. 4 is a schematic structure diagram of an ultrafast camera system according to another embodiment.

FIG. 4 is a schematic structure diagram of an ultrafast camera system according to another embodiment.

Referring to FIG. 4, an ultrafast camera system 10b may use a microwave signal of a voltage-controlled oscillator (VCO) as a reference signal of a timing detector 300, instead of an electrical pulse of an ultrafast camera system 10a.

To this end, the ultrafast camera system 10b includes a pulsed laser 100, a VCO 210, the timing detector 300, and a circulator 410 to which a sensor head 400a is connected. Further, the ultrafast camera system 10b further includes a timing detector for synchronization 500 to synchronize/frequency-lock the VCO 210 with the pulsed laser 100.

The VCO 210 is an independent signal source outside of the pulsed laser 100. Therefore, in order for the VCO 210 to provide the timing detector 300a with a reference signal for detecting a time-of-flight change an optical pulse, it is required to synchronize the phase of the VCO 210 with a repetition rate of the pulsed laser 100. As described above with reference to FIG. 1, a circuit that synchronizes a crossover point of a microwave with an optical pulse train of the pulsed laser 100 can be variously designed. In the description, it is described that the VCO 210 is synchronized with the pulsed laser 100 by the timing detector for synchronization 500.

The timing detector for synchronization 500 receives a first optical pulse train (Pulse 1) of the pulsed laser 100 and a microwave signal output from the VCO 210. The timing detector for synchronization 500 outputs an electric signal corresponding to a timing error between the microwave signal and the first optical pulse train. At this time, the VCO 210 compensates for the timing error based on a feedback signal received from the timing detector for synchronization 500 and outputs a reference signal synchronized with the first optical pulse train. The frequency of the reference signal $f_o$ may be an integer-fold of the repetition rate of the optical pulse ($n*f_{rep}$). The timing detector for synchronization 500 can be implemented in the same structure as the timing detector 300 for measuring, but the two timing detectors 300 and 500 are not required to be same type.

Timing detector 300 receives the optical pulse train whose time-of-flight is changed while passing a sensor head 400a, and receives the phase-locked microwave signal from the VCO 210 as a reference signal. The timing detector 300 calculates the timing error between the optical pulse and the microwave signal based on electro-optic sampling. At this time, the timing detector 300 outputs an electrical signal $\Delta V$ proportional to the timing error. The electrical signal output from the timing detector 300 is proportional to a displacement of the measuring point ($\Delta L$).

Figure 5A:
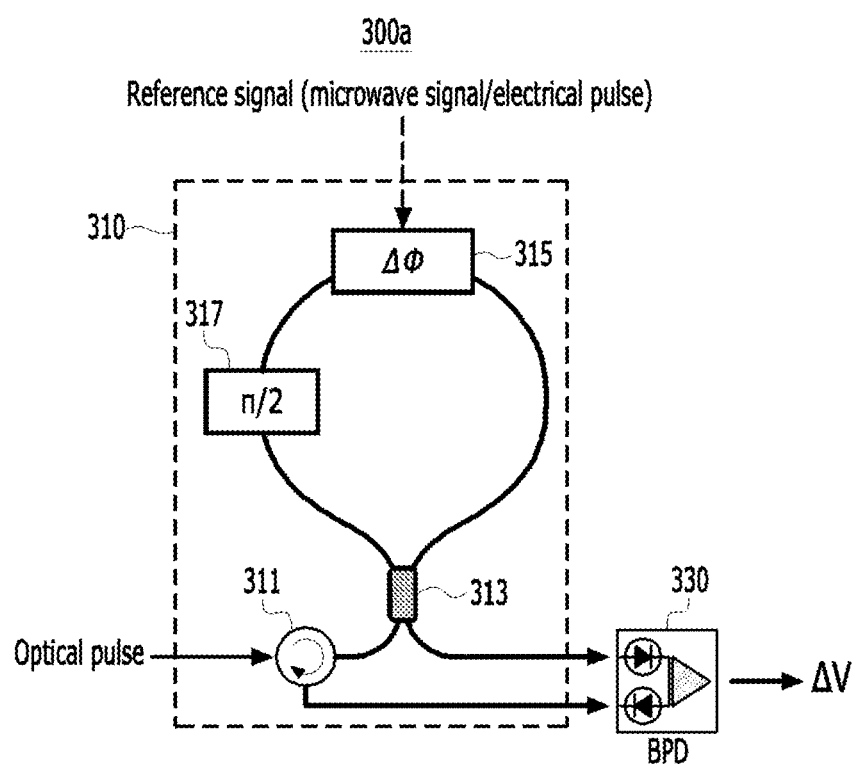
FIG. 5A and FIG. 5B are examples of electro-optic sampling-based timing detector according to an embodiment.
Figure 5B:
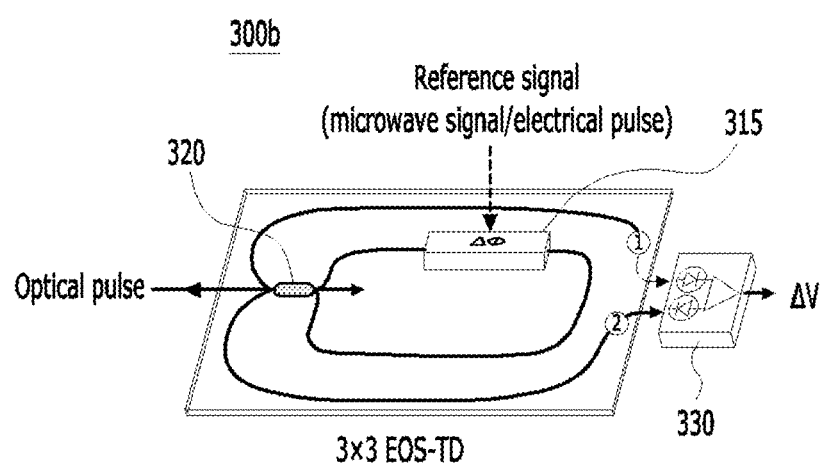

FIG. 5A and FIG. 5B are examples of electro-optic sampling-based timing detector according to an embodiment.

Referring to FIG. 5A and FIG. 5B, a timing detector 300 receives a reference signal synchronized with a pulsed laser 100 and an optical pulse at a surface of a measurement target 1, and outputs an electrical signal corresponding to a timing error between the reference signal and the optical pulse.

As described above, the timing detector 300 can be implemented with various techniques. For example, an optical phase detector may be implemented with a fiber-loop optical-microwave phase detector (FLOM-PD) or a 3×3 coupler-based phase detector.

Referring to FIG. 5A, a timing detector 300a implemented with a FLOM-PD may include a loop interferometer 310 and a balanced photodetector (BPD) 330. The loop interferometer 310 may include a circulator 311, a coupler 313 implemented in a loop, an electro-optic phase modulator 315, and a quarter-wave π/2 bias unit 317. The timing detector 300 further includes a balanced photodetector (BPD) 330. The balanced photodetector (BPD) 330 receives two optical signals output from two output ports of the loop interferometer 310, and outputs a difference of the optical signal intensity between the two optical signals as an electrical signal. The timing detector 300 may modulate optical signal using reference signal in the loop interferometer 310 where the input optical signal is divided and then the divided signals circulate in different directions. Then the signals circulating the loop are interfered with, and are output to two interference signals. The timing detector 300 may wavelength-divide each of two interference signals into corresponding channels.

The optical pulses reflected from the surface of the measurement target are input to the timing detector 300a. The input optical pulse passes through the circulator 311 and reaches the coupler 313. The coupler 313 generates two optical pulses by dividing the power of the optical pulse in half, and then transmits them in different directions on the loop.

An electro-optical phase modulator 315 receives the reference signal and modulates phase of a pulse circulating in a first direction according to an instantaneous voltage of the received reference signal. The reference signal may be an electrical signal output from an electrical pulse generator 200 shown in FIG. 3 or from a VCO 210 shown in FIG. 4. As described above with reference to FIG. 3, when the optical pulse is positioned in a linear area of the electrical signal (e.g., a rising edge of a photocurrent pulse), a relative timing and a relationship of the instantaneous voltage between the optical pulse and the rising edge become linear.

A phase difference between the pulse circulating in a first direction and the pulse circulating in a second direction becomes π/2 while the pulses passes through the bias unit 317. While the pulses circulate in the different directions on the loop, a phase difference between the pulses occurs. Then the pulses are combined in a coupler 313, and, at this time, interference occurs between the pulses circulating in the different directions. The coupler 313 divides the combined optical signal, and the divided two optical signals (two interference signals) are output to two output ports of the loop interferometer 310. The divided two optical signals are input to a balanced photodetector 330.

An intensity difference between the two optical signals input to the balanced photodetector 330 is proportional to the timing error between the reference signal and the optical pulse input to the timing detector 300. Through two photodiodes and a differential amplifier, the balanced photodetector 330 may convert the intensity difference between two optical signals input to the two photodiodes, into an electric signal $\Delta V$. At this time, since the timing error between the reference signal and the optical pulse is proportional to a time-of-flight change $\Delta TOF$ at the measurement point/the displacement $\Delta L$ of the measurement point, the displacement $\Delta L$ of the measurement point according to the movement of the measurement target may be obtained from the electric signal proportional to the timing error between the optical pulse and the reference signal.

Referring to FIG. 5B, similar to the timing detector 300a, a timing detector 300b outputs an electrical signal proportional to a timing error between the input optical signal and the reference signal through the balanced photodetector 330. However, unlike the timing detector 300a, the timing detector 300b may not include the bias unit 317 and may be a 3×3 coupler-based phase detector that is implemented with a 3×3 coupler 320 and an electro-optic phase modulator 315. Since the timing detector 300b does not use the bias unit 317 being a non-reciprocal magneto-optic device, the timing detector 300b can be integrated on a chip.

Figure 6:
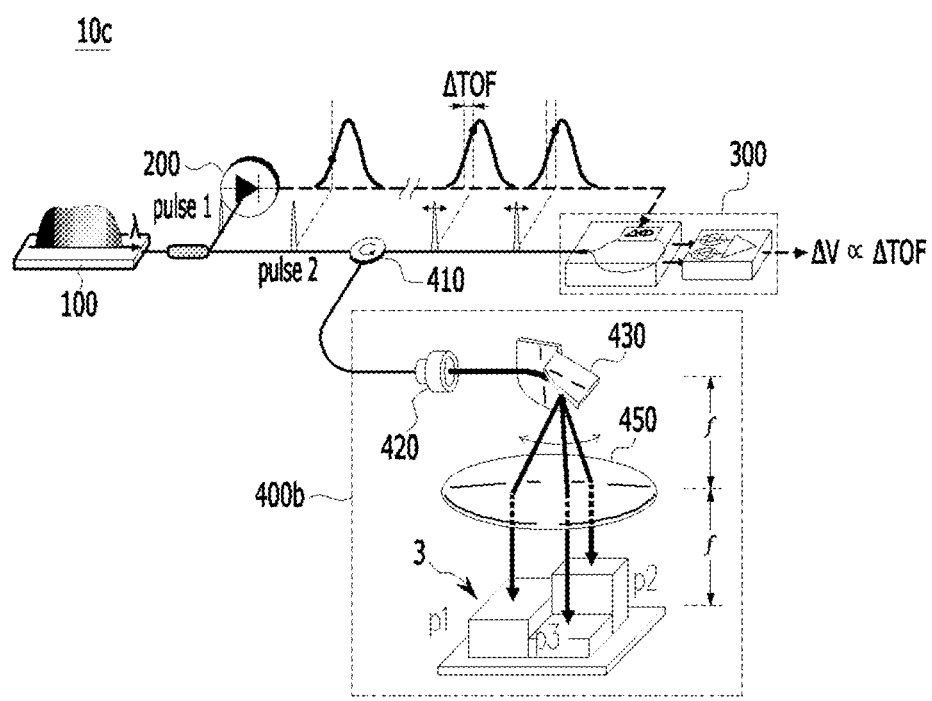
FIG. 6 is a schematic structure diagram of an ultrafast camera system according to yet another embodiment.

FIG. 6 is a schematic structure diagram of an ultrafast camera system according to yet another embodiment.

Referring to FIG. 6, an ultrafast camera system 10c may use a sensor head 400b including a beam scanner, in order to measure movements of several points with high speed and high resolution in real time at once. The ultrafast camera system 10c may be implemented with the sensor head 400b substituting for the sensor head 400a of the ultrafast camera system 10a. In FIG. 6, the ultrafast camera system 10c in which the sensor head 400a of the ultrafast camera system 10a is substituted with the sensor head 400b is described. However, the sensor head 400a of the ultrafast camera system 10c may be substituted with the sensor head 400b.

The sensor head 400b may include a fiber collimator 420, a beam scanner 430, and a lens 450. The beam scanner 430 may be a galvano beam scanner. The lens 450 may be an objective lens, and a focal length f is adjusted so that the beams scanned at high speed by the beam scanner 430 are vertically injected into a measurement target 3.

The optical pulse train transmitted from the circulator 410 to the optical fiber collimator 420 of the sensor head 400b is rapidly transferred to various points of the measurement target 3 by the beam scanner 430, and the optical pulse trains reflected from various points on the surface of the measurement target 3 are collected again in the fiber collimator 420. The optical pulse trains having passed the sensor head 400b are transmitted to the timing detector 300 via the circulator 410.

Like the ultrafast camera system 10a or the ultrafast camera system 10b, the timing detector 300 of the ultrafast camera system 10c receives the optical pulse trains whose time-of-flight is changed and receives a reference signal from the electrical pulse generator 200 or the VCO 210. The timing detector 300 outputs an electrical signal $\Delta V$ proportional to the timing error between the optical pulse and the reference signal based on electro-optic sampling. The electrical signal $\Delta V$ corresponds to a displacement $\Delta L$ of the measurement points or the time-of-flight change $\Delta TOF$. The ultrafast camera system 10c can image a three-dimensional (3D) shape by measuring the time-of-flight change in plural objects having different heights and/or reflectance $\rho 1$, $\rho 2$, and $\rho 3$. The ultrafast camera system 10c can extract only time-of-flight information from the objects having different reflectance by correcting sensitivity in real time using some of the optical power reflected back from each object.

The ultrafast camera system 10c can measure at once the movements or shapes of multiple points of the measurement target 3 within a scanning range via the beam scanner 430. Particularly, the ultrafast camera system 10c can measure the movement of the measurement target 3 in real time with high speed and high resolution even if the measurement target 3 with a complicated structure moves. The ultrafast camera system 10c can be used for 3D surface profile imaging of the measurement target 3.

FIG. 7, FIG. 8A, FIG. 8B and FIG. 9 are schematic structure diagrams of an ultrafast camera system according to still another embodiment.

Figure 7:
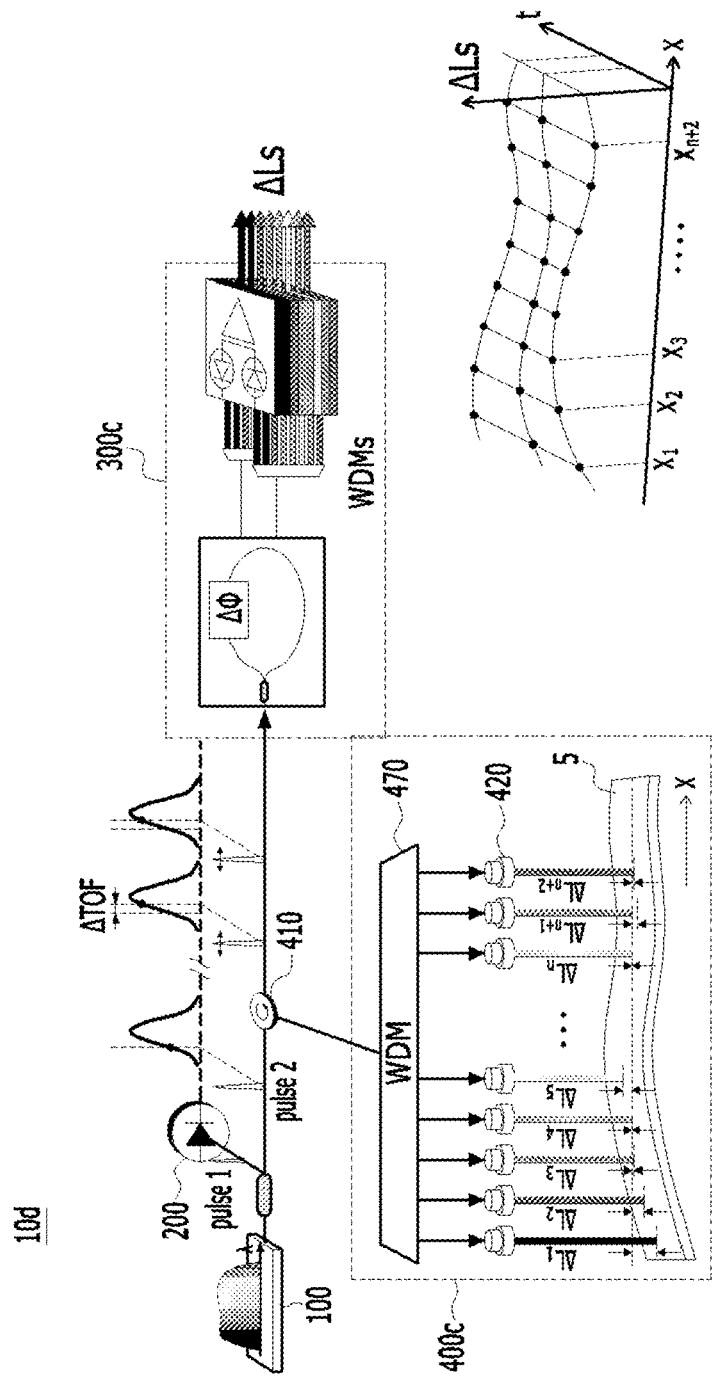
FIG. 7, FIG. 8A, FIG. 8B and FIG. 9 are schematic structure diagrams of an ultrafast camera system according to still another embodiment.

Referring to FIG. 7, an ultrafast camera system 10d may use a sensor head 400c including a wavelength division multiplexer (WDM) in order to simultaneously measure the movements of multiple points with high speed and high resolution in real time.

The ultrafast camera system 10d can be implemented by substituting the sensor head 400a of the ultrafast camera system 10a or the ultra high speed camera system 10b with a sensor head 400c and by substituting a timing detector 300 with a multi-channel timing detector 300c.

The sensor head 400c may include a wavelength division multiplexer 470 and a fiber collimator for each channel 420. The wavelength division multiplexer 470 divides an input optical pulse train into a narrow bandwidth in the spectrum domain, and each of sub-pulses divided by wavelength is transmitted to the fiber collimator for each channel 420.

The sub-pulses reflected at the surface of a measurement target 5 are collected again by the fiber collimator for each channel 420. The sub-pulses returned to the fiber collimator for each channel 420 are multiplexed by the wavelength division multiplexer 470, and then the multiplexed optical signal is transmitted to the timing detector 300c via the circulator 410.

The multi-channel timing detector 300c receives the multiplexed optical signal and receives a reference signal from an electrical pulse generator 200 or a VCO 210. The multi-channel timing detector 300c detects a timing error of each sub-pulse included in the multiplexed optical signal.

The multi-channel timing detector 300c can detect the timing error of each sub-pulse by using a plurality of balanced photodetectors (BPDs). That is, the multi-channel timing detector 300c circulates the input optical signal in different directions, and then outputs an interference signal to each of two output ports of a loop interferometer. Further, the multi-channel timing detector 300c may wavelength-divide each interference signal output from the loop interferometer, and then may transmit the wavelength-divided optical signal to an input port of a corresponding balanced photodetector.

When the sensor head 400c injects sub-pulses into points from $x_1$ to $x_{n+2}$ in the x-axis direction of the measurement target 5 at time t, the ultrafast camera system 10d can measure at once movements of the measurement object 5 in the x-axis direction with high speed and high resolution in real time. Over time, displacements $\Delta Ls$ of the points on the x-axis can be output from the multichannel timing detector 300c.

The sensor head 400c can be variously designed to fit for the measurement purpose as follows.

Figure 8A:
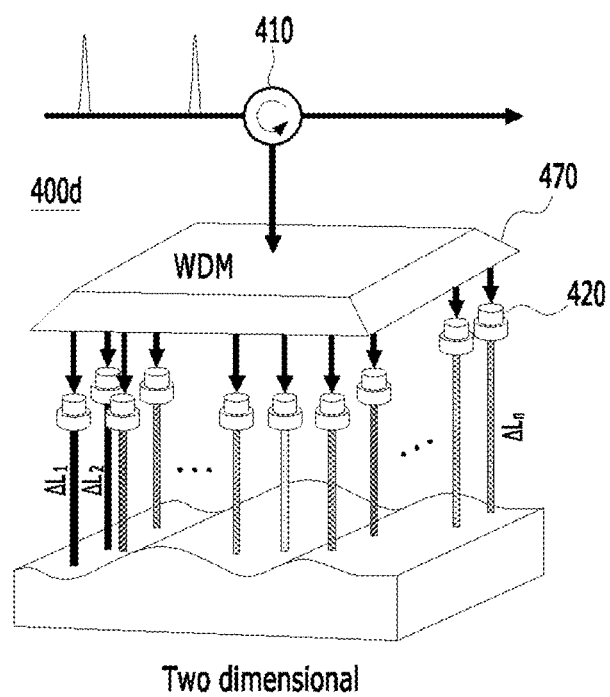

Referring to FIG. 8A, the sensor head 400d includes a wavelength division multiplexer 470 and a fiber collimator for each channel 420. Here, the fiber collimator for each channel 420 may be arranged in two dimensions. In the ultrafast camera system 10d shown in FIG. 7, the sensor head 400d may be used instead of the sensor head 400c. The ultrafast camera system combined with the sensor head 400d can measure at once the movements or the 3D shape of the measurement target with high speed and high resolution in real time.

Figure 8B:
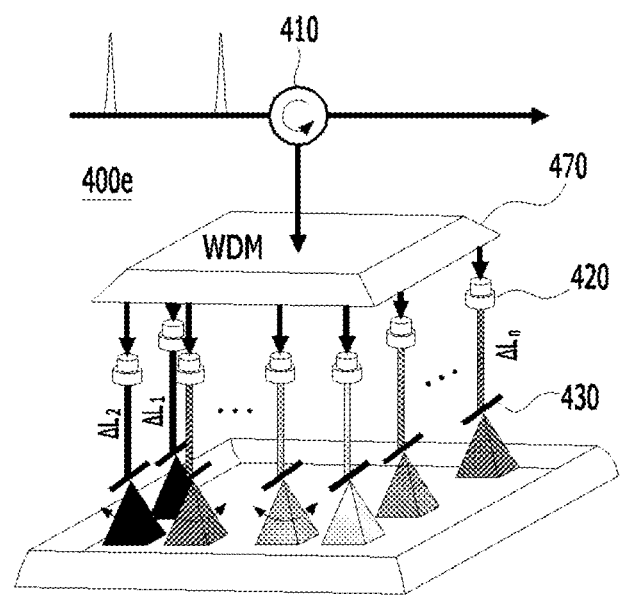

Referring to FIG. 8B, a sensor head 400e may include a wavelength division multiplexer 470 and a fiber collimator for each channel 420 arranged in two dimensions, and a beam scanner 430 may be additionally combined with each fiber collimator 420. In the ultrafast camera system 10d shown in FIG. 7, the sensor head 400e may be used instead of the sensor head 400c. The ultrafast camera system combined with the sensor head 400e can measure at once the movements or 3D shape of the measurement target with high speed and high resolution in real time.

Figure 9:
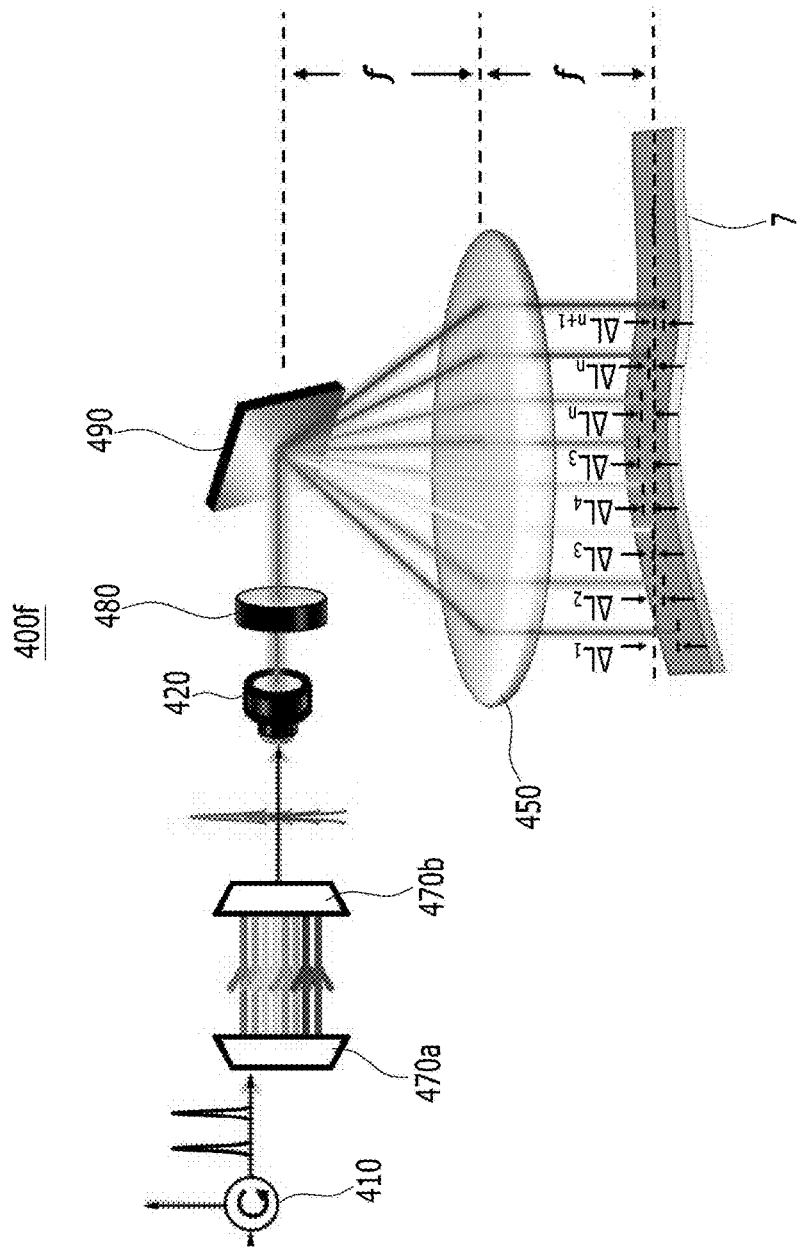

Referring to FIG. 9, the sensor head 400f may include wavelength division multiplexers 470a and 470b that generate sub-pulses and multiplex the generated sub-pulses, a collimator 420, a wave plate 480 that changes a polarization direction of a beam to a certain angle, a wavelength dispersion device 490, and a lens 450. The wave plate 480 may be a half-wave plate (HWP) that changes the polarization direction of a light by 90 degrees. In the ultrafast camera system 10d shown in FIG. 7, the sensor head 400f may be used instead of the sensor head 400c.

The wavelength division multiplexer 470a receives an optical pulse train from a circulator shown in FIG. 7, and wavelength-divides the input optical pulse train into a narrow bandwidth in the spectrum domain. Each of the wavelength-divided sub-pulses is multiplexed in the wavelength division multiplexer 470b and then input to the collimator 420.

The optical signal multiplexed in the wavelength division multiplexer 470b passes through the collimator 420 and the wave plate 480, and then reaches the wavelength dispersion device 490. The wavelength dispersion device 490 is a spectroscopic unit that can be implemented with a diffraction lattice (grating) or a prism. The wavelength dispersion device 490 disperses the wavelength of the optical signal into a 1D space.

The sub-pulses dispersed at a certain angle according to the wavelength by the wavelength dispersion device 490 can be vertically injected into the measurement target 7 via the lens 450. A focal length f of the lens 450 is adjusted so that the sub-pulses dispersed by the wavelength dispersion device 490 can be vertically injected into the measurement target 7.

The sub-pulses reflected at the surface of the measurement target 7 pass through the wavelength dispersion device 490, the wave plate 480, and the collimator 420 and reach the wavelength division multiplexer 470b. The wavelength division multiplexer 470b transfers the reflected sub-pulses to the wavelength division multiplexer 470a. The wavelength division multiplexer 470a multiplexes the reflected sub-pulses and then transmits the multiplexed sub-pulses to the circulator 410.

The circulator 410 transfers the optical signal received from the sensor head 400f to a multi-channel timing detector 300c shown in FIG. 7. The multi-channel timing detector 300c may output an electrical signal $\Delta V$ of each of the sub-pulses included in the multiplexed optical signal. The electrical signal $\Delta V$ is a value proportional to a timing error between the sub-pulse and the reference signal, and corresponds to the displacement $\Delta L$ of the measurement points or time-of-flight change $\Delta TOF$.

A relationship between each of the n wavelengths $\lambda_1$, $\lambda_2$, ..., $\lambda_n$ injected into the measurement target 7 from the wavelength dispersion device 490 and each of the n points $p_1, p_2, \ldots, p_n$ measured according to a dispersion angle of the corresponding wavelength is predetermined. Therefore, since having information on the points $p_1, p_2, \ldots, p_n$ where the sub-pulses divided into n wavelengths are reflected at the measurement target 7, a computing device (not shown) can calculate the displacements $\Delta Ls$ at the points $p_1, p_2, \ldots,$ and $p_n$ or the time-of-flight change $\Delta TOF$ based on the electrical signal of each sub-pulse.

Figure 10:
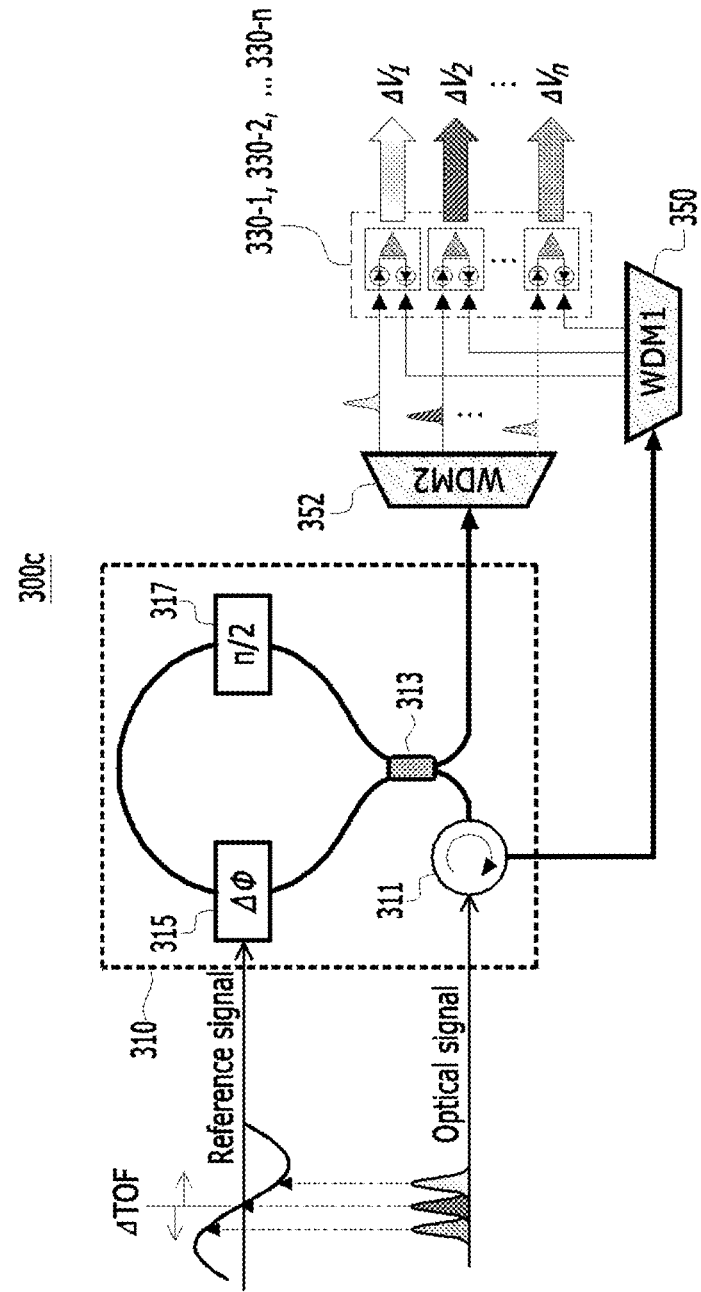
FIG. 10 is an example multi-channel timing detector according to an embodiment.

FIG. 10 is an example multi-channel timing detector according to an embodiment.

Referring to FIG. 10, a multi-channel timing detector 300c includes balanced photodetectors 330-1, 330-2, ..., 330-n for each channel, unlike timing detectors 300a and 300b shown in FIG. 5A and FIG. 5B. The multi-channel timing detector 300c includes a first demultiplexer (De-Mux) WDM1 350 that divides a first optical signal output from a loop for n channels (by wavelength), a second demultiplexer WDM2 352 that divides a second optical signal output from the loop for n channels, and balanced photodetectors 330-1, 330-2, ..., 330-n for performing balanced photodetection on each channel.

For example, when the multi-channel timing detector 300c includes a loop interferometer 311 as shown FIG. 5A, the optical signal which is obtained from multiplexing sub-pulses reflected at the surface of a measurement target passes through a circulator 311 and reaches a coupler 313. The coupler 313 generates two optical signals by dividing the power of the optical signal in half and transmits the generated two optical signals in different directions on the loop. Between the two optical signals, a phase difference occurs while they circulate an electro-optic phase modulator 315 and a quarter-wave bias unit 317 in different directions. Then the two optical signals are combined by the coupler 313. The coupler 313 divides the combined optical signal and then outputs the two divided optical signals. Each of the two output optical signals is input to the first demultiplexer 350 and the second demultiplexer 352, respectively.

The first demultiplexer 350 and the second demultiplexer 352, which are channels corresponding to the wavelengths divided by the sensor head, divide the input optical signal. The optical signals of each channel divided by the first demultiplexer 350 and the second demultiplexer 352 are input to the balanced photo detectors 330-1, 330-2, ..., 330-n of each channel. Each balanced photodetector receives the optical signals of the corresponding channel divided by the first demultiplexer 350 and the second demultiplexer 352, with two photodiodes. The balanced photodetector of the K-th channel may output an electrical signal $\Delta V_k$ corresponding to the intensity difference of two optical signals input into the two photodiodes.

Figure 11:
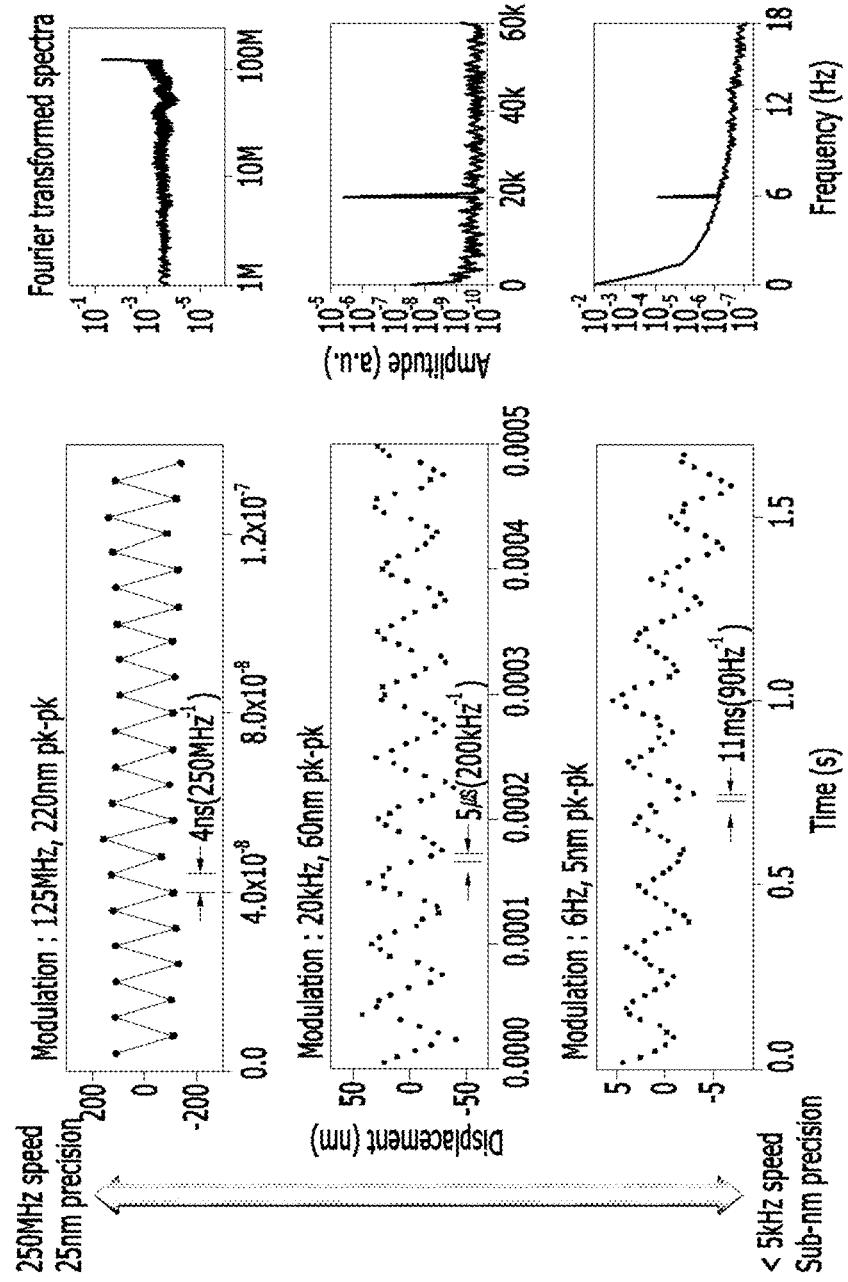
FIG. 11 and FIG. 12 are graphs showing displacement measurement performance of an ultrafast camera system according to an embodiment.
Figure 12:
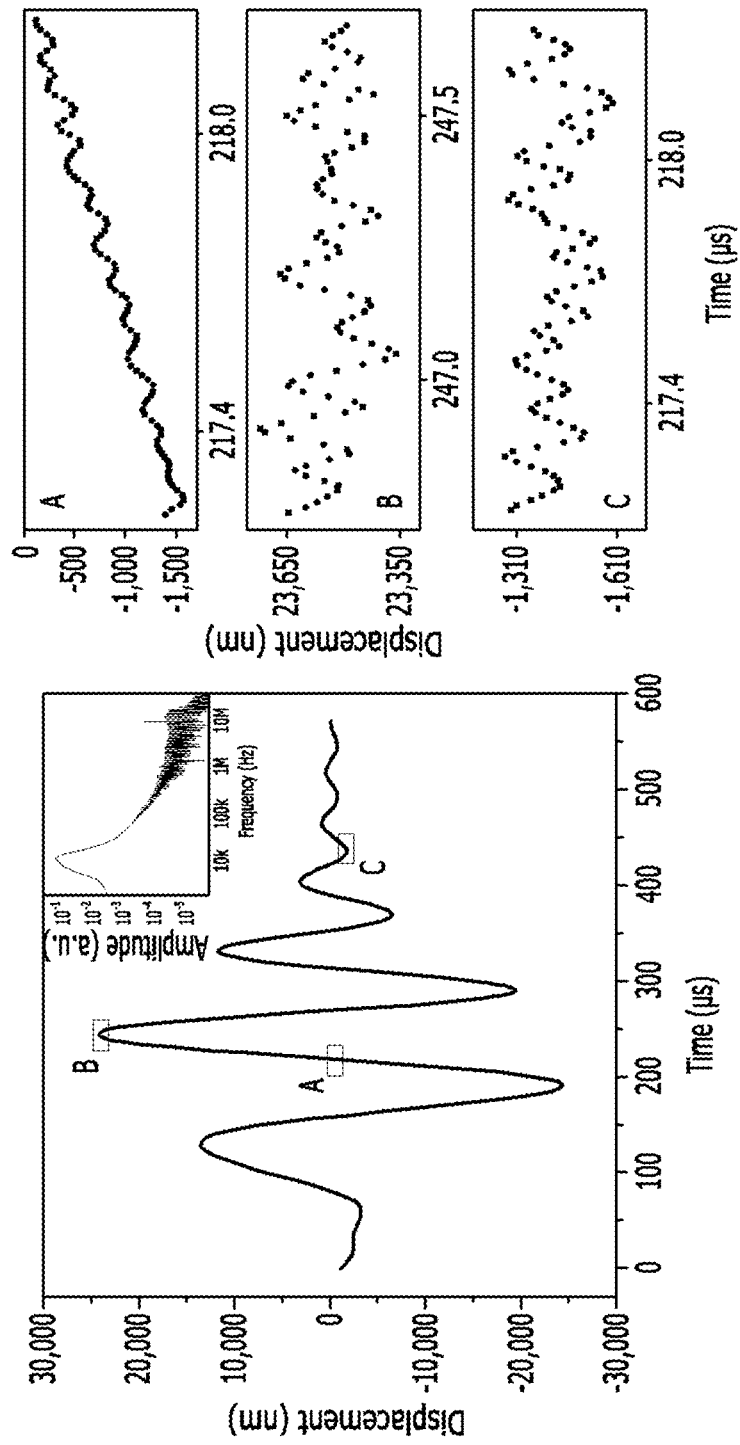

FIG. 11 and FIG. 12 are graphs showing displacement measurement performance of an ultrafast camera system according to an embodiment.

Referring to FIG. 11, the graphs illustrate that the ultrafast camera system of the present disclosure can measure the displacements modulated in various ways (e.g., 125 MHz and 220 nm, 20 kHz and 60 nm, 6 Hz and 5 nm) with high speed in real time. The graphs on the right are obtained through Fourier transform of the displacements over time into amplitudes according to frequency.

Referring to FIG. 12, the graphs illustrate that the ultrafast camera system of the present disclosure can measure a large dynamic displacement and high-speed displacement in real time. The graphs on the right are enlargements of points A, B, and C, respectively.

Hereinafter, an ultrafast camera system that disperses an optical pulse by wavelength and measures movements or shape by line with high speed and high resolution in real time will be described.

Figure 13:
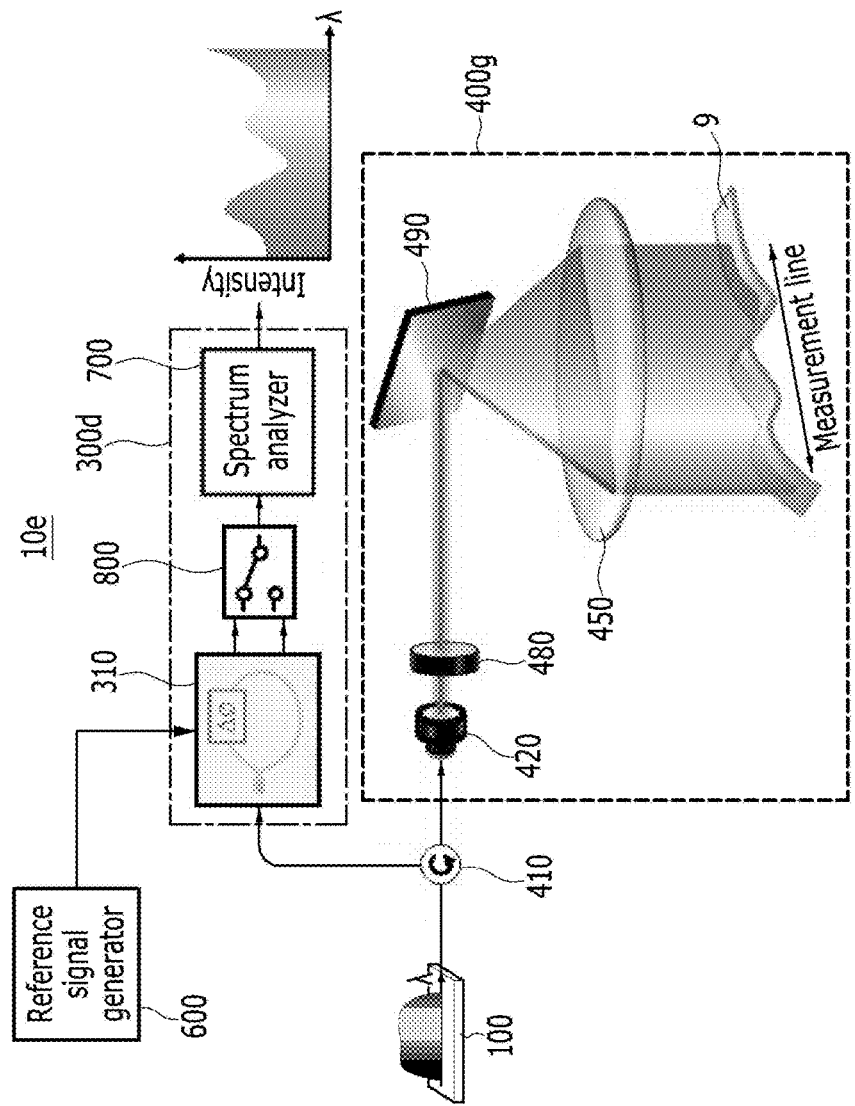
FIG. 13 and FIG. 14 are schematic structure diagrams of an ultrafast camera system based on wavelength dispersion according to yet another embodiment.
Figure 14:
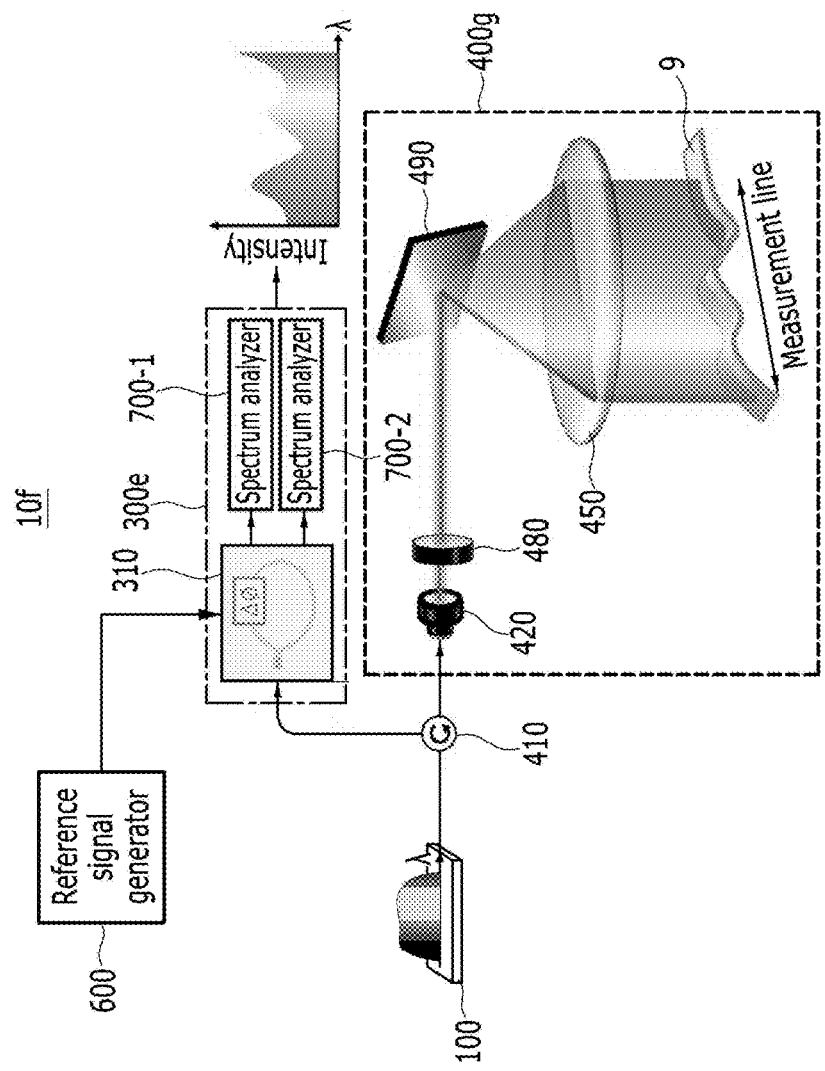

Each of FIG. 13 and FIG. 14 is a schematic structure diagram of an ultrafast camera system based on wavelength dispersion according to yet another embodiment.

First, Referring to FIG. 13, an ultrafast camera system 10e can disperse an optical pulse into 1D space corresponding to a wavelength spectrum, and can measure a movement or shape of a measurement line on a surface at once through the reflected optical spectrum information. The ultrafast camera system 10e may include a pulsed laser 100, a continuous timing detector 300d, a reference signal generator 600 providing a reference signal to the continuous timing detector 300d, a circulator 410, and a sensor head 400g. The reference signal generator 600 may be implemented with an electrical pulse generator 200 shown in FIG. 3 and may output the electrical pulse as the reference signal. Otherwise, the reference signal generator 600 may be implemented with a VCO 210 and timing detector for synchronization 500 shown in FIG. 4, and may output a microwave signal of the VCO 210 synchronized/frequency-locked with the laser.

The circulator 410 transmits an optical pulse output from the pulsed laser 100 to the sensor head 400g, and then transfers the optical pulse reflected back at the sensor head 400g to the continuous timing detector 300d. The sensor head 400g injects the optical pulse transmitted from the circulator 410 to a measurement target 9, and then returns the optical signal reflected from the surface of the measurement target 9 to the circulator 410.

The sensor head 400g may include a collimator 420, a wave plate 480 to change the polarization direction of a beam by a predetermined angle, a wavelength dispersion device 490, and a lens 450. The wave plate 480 may be a half-wave plate (HWP) that changes the polarization direction of a light by 90 degrees.

The wavelength dispersion device 490 disperses the input optical pulse (beam) at an angle according to the wavelength, and the dispersed wavelength signals are vertically injected into the measurement target 9 via the lens 450. At this time, the wavelength signals are continuously dispersed in the wavelength dispersion device 490, and continuous points at which the continuously dispersed wavelength signals arrive may form a line. A wavelength spectrum dispersed in the wavelength dispersion device 490 corresponds to position information in 1D space. The signals of the wavelength spectrum reflected at the measurement line of the measurement target 9 pass through the wavelength dispersion device 490, the wave plate 480, and the collimator 420, and then are input to the circulator 410.

The continuous timing detector 300d receives the reflected optical signal and outputs a signal intensity corresponding to a timing error of the continuous wavelength signals included the optical signal.

The continuous timing detector 300d may be implemented in various structures. For example, the continuous timing detector 300d may include a loop interferometer 310 shown in FIG. 5 that receives a reference signal from a reference signal generator 600 and outputs two interference signals. Further, the continuous timing detector 300d may include one spectrum analyzer 700, and an optical switch 800 that transmits at least one of output signals of the loop interferometer 310 to the spectrum analyzer 700. Here, it is assumed that the optical switch 800 is synchronized with the spectrum analyzer 700.

Figure 16:
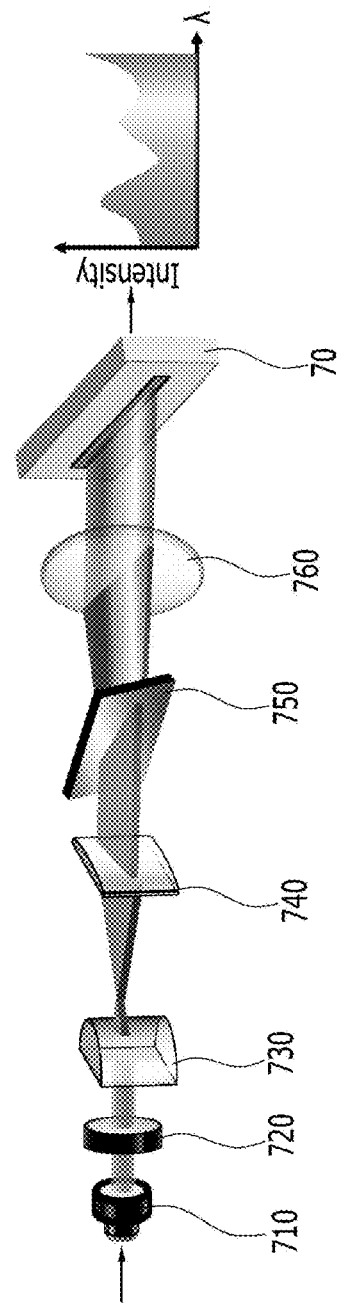
FIG. 16 is an example spectrum analyzer according to an embodiment.

The spectrum analyzer 700 can be configured with devices for measuring signal intensity according to a wavelength spectrum of an input signal. A commercial optical spectrum analyzer may be used as the spectrum analyzer 700. Otherwise, the spectrum analyzer 700 may be fabricated from the combination of a wavelength dispersion device and a line scan camera as shown in FIG. 16. The continuous timing detector 300d can output the signal intensity measured from the spectrum of the input optical signal. Since the wavelength spectrum corresponds to the position information in 1D space, the displacement of a specific position or time-of-flight change can be obtained from the signal intensity at a certain wavelength.

The connection relationship among the loop interferometer 310, the optical switch 800, and the spectrum analyzer 700 included in the continuous timing detector 300d can be designed in variously ways.

According to an embodiment, the optical switch 800 can switch the signals output from two output ports of the loop interferometer 310 and then can input the switched signals to the spectrum analyzer 700. The optical switch 800 alternately inputs the output signals of the two output ports of the loop interferometer 310 to the spectrum analyzer 700, and the spectrum analyzer 700 can measure the spectrum intensity of each input signal. A computing device (not shown) included in the continuous timing detector 300d may output the difference between the two signal intensities measured by the spectrum analyzer 700, during the switching period of the optical switch 800. The difference between the two signal intensities corresponds to the timing error/time-of-flight change. At this time, noise in the optical signal intensity can be suppressed as in the balanced photodetector (BPD) 330 shown in FIG. 5 used for measuring a single point. Through switching by the optical switch 800, the ultrafast camera system 10e can image the measurement target with a half speed of the maximum imaging speed of the spectrum analyzer 700.

Figure 17:
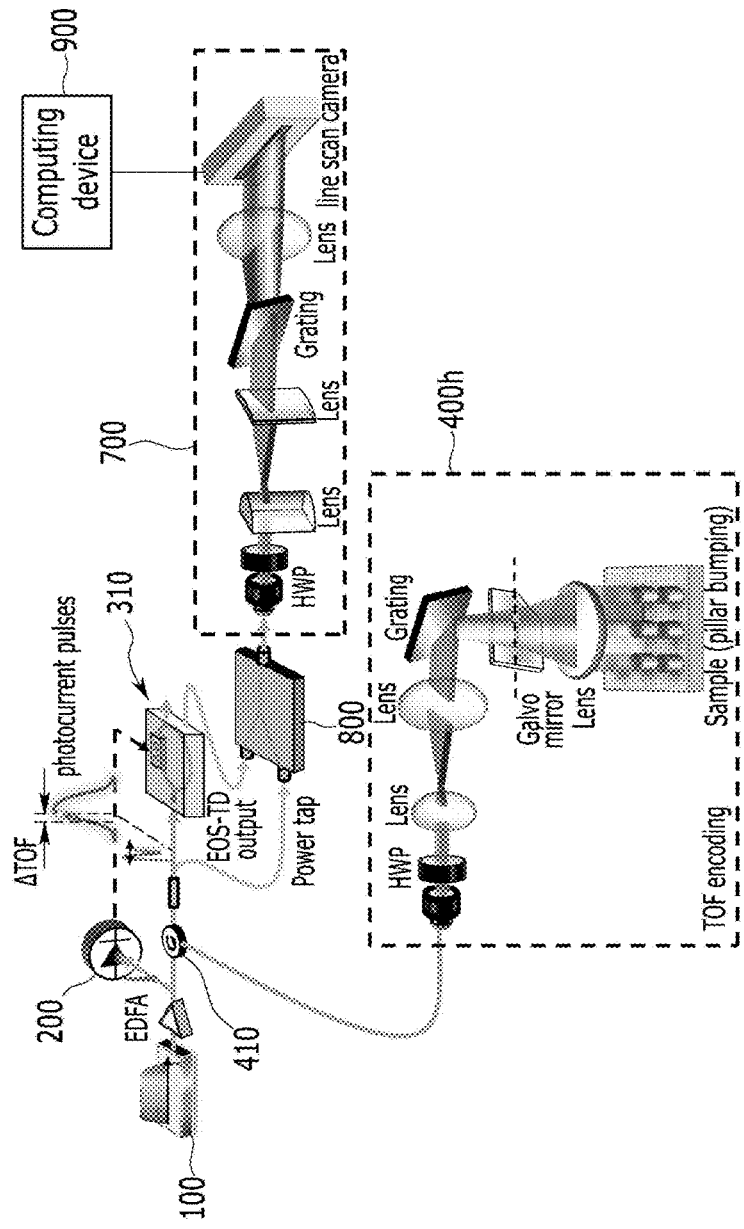
FIG. 17, FIG. 18 and FIG. 19 show examples of a wavelength dispersion-based ultrafast camera system to provide optical power correction.

According to another embodiment, the continuous timing detector 300d can perform optical power correction using an optical switch 800 (refer to FIG. 17). In the process that an optical power is measured by a continuous timing detector after passing through a sensor, the optical power may be changed due to various causes including polarization rotation. Then, due to the change in optical power, the signal detected by a phase detector does not properly reflect the phase error, and the sensitivity is deteriorated. To solve such problem, the optical switch 800 provides input signals to the spectrum analyzer 700 alternately. Here, a signal from one of the two output ports of the loop interferometer 310 and part of signals before being input to the loop interferometer 310 (e.g., 5% tapped) can be received. When the output signal from the loop interferometer 310 is received, the spectrum analyzer 700 can measure a signal intensity including time-of-flight change information (TOF signal intensity). In addition, the spectrum analyzer 700 can measure the signal intensity before being input to the loop interferometer 310. The computing device (not shown) included in the continuous timing detector 300d can acquire the signal intensity measured by the spectrum analyzer 700. The computing device may calculate a correction value required for optical power correction of the TOF signal intensity based on the signal intensity before being input to the loop interferometer 310. The correction value may be a ratio of the reference optical power and the optical power returned from the sensor. The computing device corrects the optical power change by multiplying the TOF signal intensity measured at the spectrum analyzer 700 with the correction value. As a result, the signal intensity whose sensitivity due to the optical power change is corrected is finally output.

According to yet another embodiment, a continuous timing detector 300d may be implemented with a 3×1 optical switch (not shown) instead of a 2×1 optical switch 800. The 3×1 optical switch can receive signals output from two output ports of the loop interferometer 310 and some signals (e.g., 5% tapped) before being input to the loop interferometer 310, and then can switch the three signals to transmit to the spectrum analyzer 700. As a result, the continuous timing detector 300d can not only suppress the noise in the optical signal intensity but also calibrates the sensitivity due to the optical power change. In this case, the ultrafast camera system 10e can image the measurement target with ⅓ speed of the maximum imaging speed of the spectrum analyzer 700.

Meanwhile, referring to FIG. 14, an ultrafast camera system 10f may be implemented with the continuous timing detector 300e including two spectrum analyzers 700-1 and 700-2, instead of the continuous timing detector 300d shown in FIG. 13.

The continuous timing detector 300e may include a loop interferometer 310 shown in FIG. 5, and two spectrum analyzers 700-1 and 700-2.

According to an embodiment, each of the two interference signals output from the loop interferometer 310 may be input to the spectrum analyzers 700-1 and 700-2. Then, a computing device (not shown) included in the ultrafast camera system 10f can output an intensity difference of the measurement signals output from the two spectrum analyzers 700-1 and 700-2. At this time, since the two spectrum analyzers 700-1 and 700-2 are calibrated to output the same signal intensity for the same optical signal, the ultrafast camera system 10f can image the measurement target with the maximum imaging speed of the spectrum analyzer 700.

Figure 18:
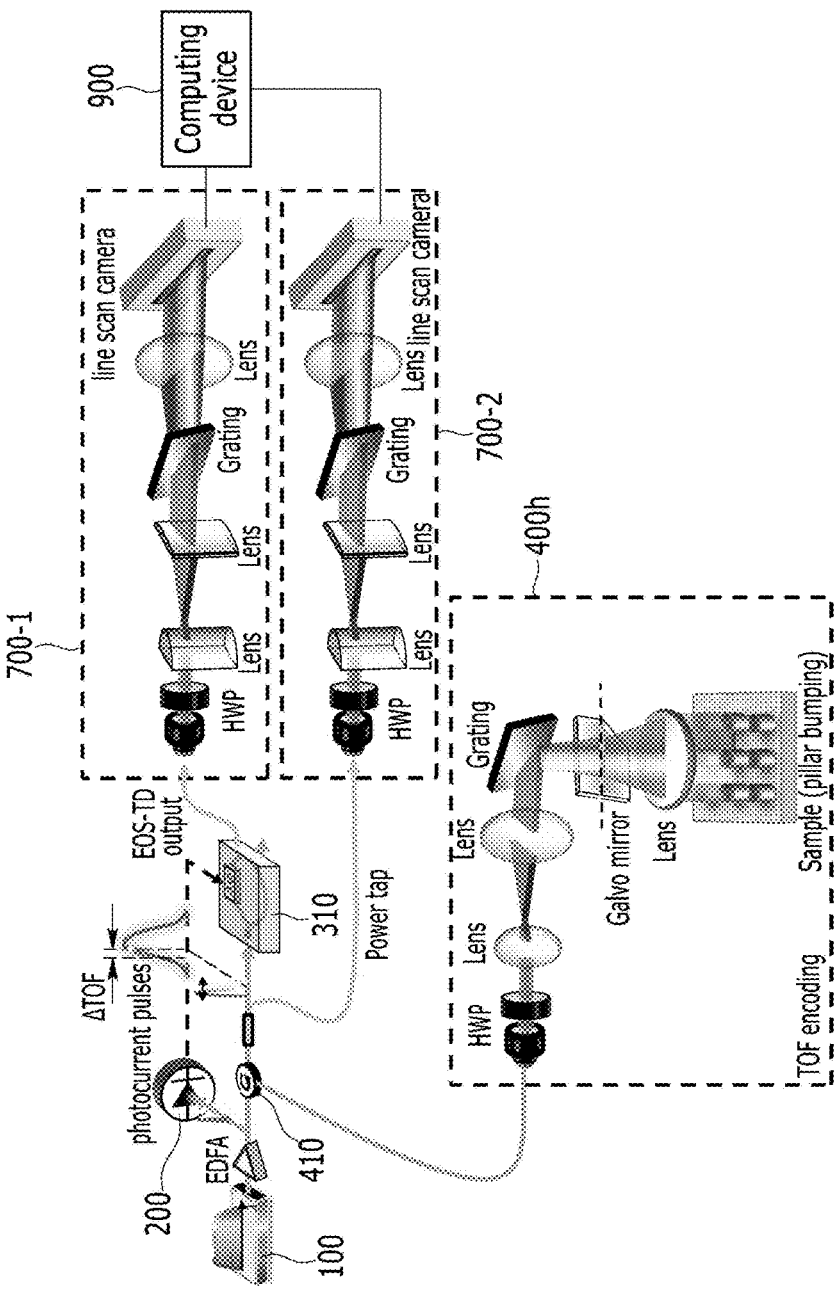
Figure 19:
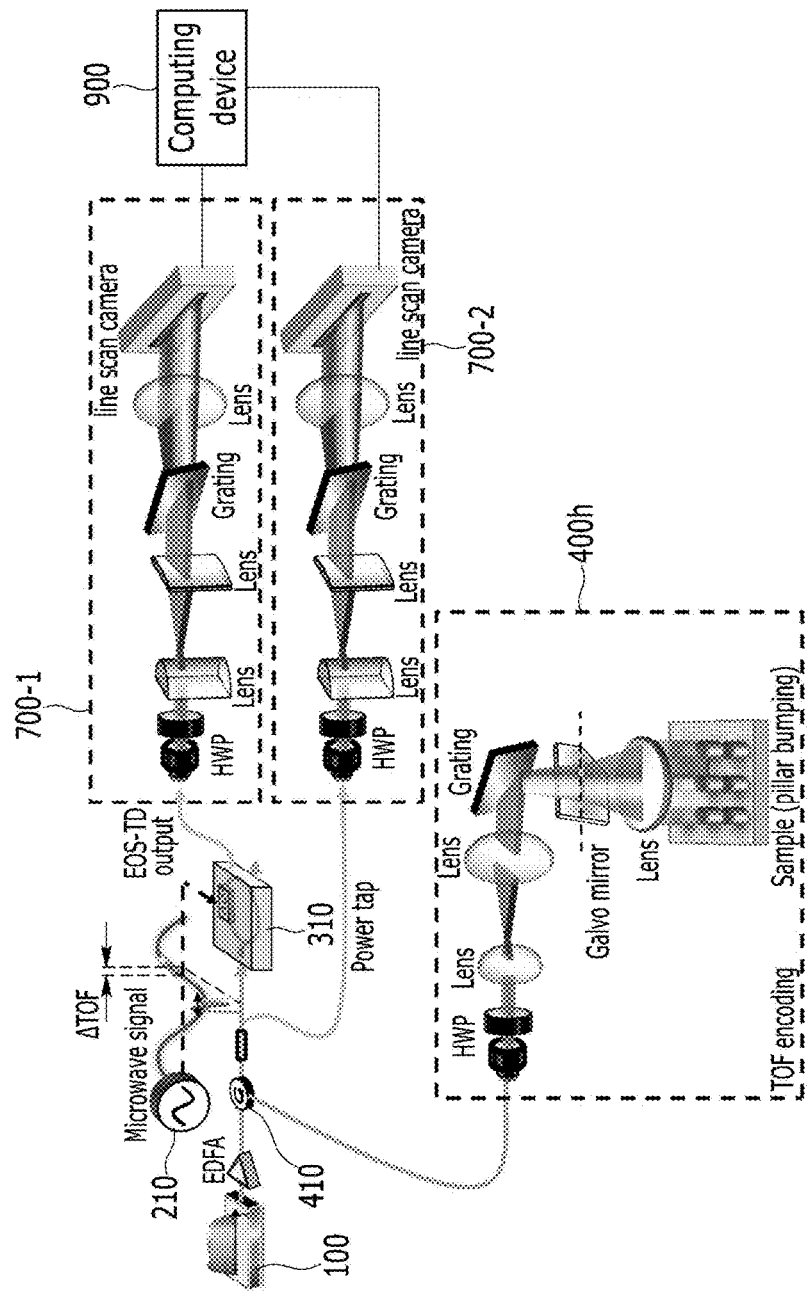

According to another embodiment, a spectrum analyzer may be used for optical power correction (refer to FIG. 18 and FIG. 19). A spectrum analyzer 700-1 may receive a signal from one of the two output ports of a loop interferometer 310, and the other spectrum analyzer 700-2 may receive part of signal (e.g., 5% tapped) before being input to the loop interferometer 310. When the output signal of the loop interferometer 310 is received, the spectrum analyzer 700-1 can measure a signal intensity including time-of-flight change information (TOF signal intensity). In addition, the spectrum analyzer 700-2 can measure the signal intensity before the signal is input to the loop interferometer 310. The computing device (not shown) included in the continuous timing detector 300e can calculate a correction value required for optical power correction of the TOF signal intensity from the signal intensity measured by the spectrum analyzer 700-2, and can finally output the signal intensity whose sensitivity is corrected through multiplying the correction value and the TOF signal intensity measured by the spectrum analyzer 700-1. The correction value may be a ratio between the reference optical power and the power of the signal returning from a sensor.

The length or the thickness of a beam may be adjusted by controlling the magnification of a lens 450 being an objective lens or the density of a wavelength dispersion device 490, in the sensor head 400g. As a result, high spatial resolution can be provided.

Figure 15:
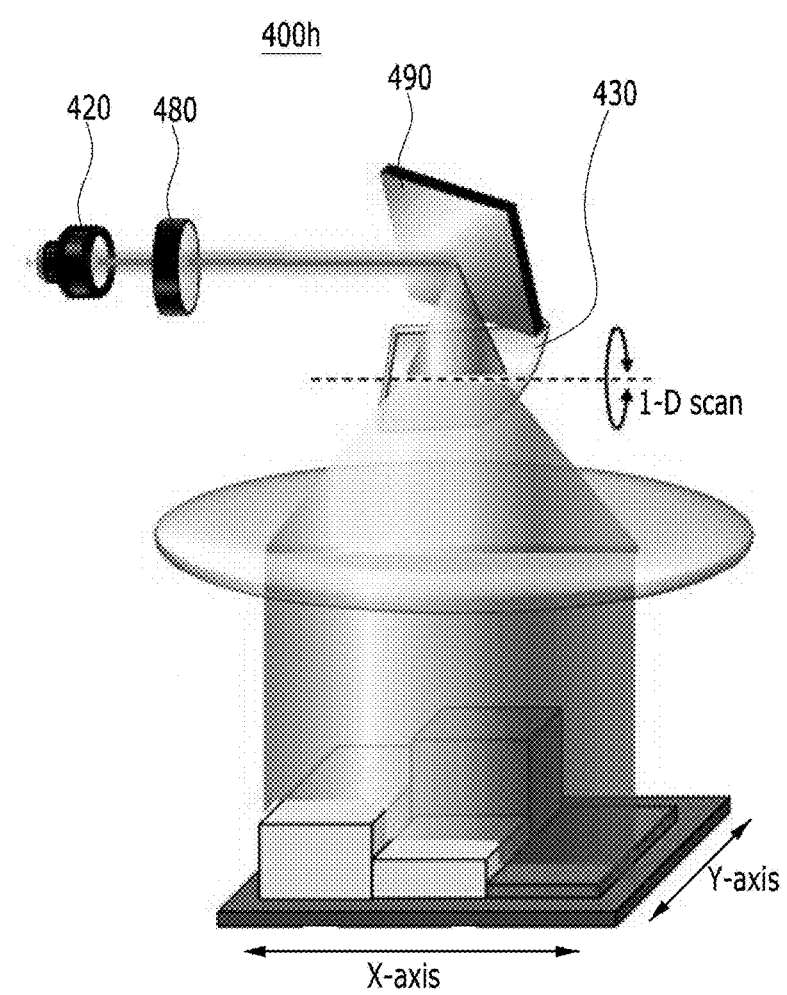
FIG. 15 is a structure diagram for 3D imaging by an ultrafast camera system based on wavelength dispersion according to still another embodiment.

FIG. 15 is a structure diagram for 3D imaging by an ultrafast camera system based on wavelength dispersion according to still another embodiment.

Referring to FIG. 15, in an ultrafast camera system 10e shown in FIG. 13 or an ultrafast camera system 10f shown in FIG. 14, a sensor head 400g for 1D imaging may be substituted with a sensor head 400h for 3D imaging.

The 3D imaging sensor head 400h includes a collimator 420, a wave plate 480, and a wavelength dispersion device 490, and may further include a beam scanner 430 that moves a measurement line (e.g., x-axis direction) to a predetermined direction (e.g., y-axis direction). The beam scanner 430 may be, for example, a galvano beam scanner. For example, the beam scanner may be set to perform 1D scanning in the direction of y-axis.

The 3D imaging sensor head 400h can transfer the wavelength signal dispersed with the wavelength spectrum, by line. Therefore, the ultrafast camera system 10e or the ultrafast camera system 10f with which the 3D imaging sensor head 400h is connected image a 3D shape through scanning a measurement target by line. Therefore, when the 3D imaging sensor head 400h is used, 3D imaging can be performed faster than a method for imaging 3D shapes using the signals reflected from limited number of points.

Alternatively, while using the sensor head 400g, the ultrafast camera system 10e/ultrafast camera system 10f can move not the beam scanner 430 but the measurement target. By moving the measurement target placed on a motorized stage in a predetermined direction (e.g., in the direction of y-axis), the ultrafast camera system 10e or the ultrafast camera system 10f can image a 3D shape through scanning the measurement target by line.

FIG. 16 is an example spectrum analyzer according to an embodiment.

Referring to FIG. 16, a spectrum analyzer 700 may be implemented in various ways. For example, the spectrum analyzer 700 may be manufactured by a combination of a diffraction lattice and a line scan camera.

Specifically, the spectrum analyzer 700 may include a collimator 710, a wave plate 720, lenses 730 and 740, a wavelength dispersion device 750, a lens 760, and a line scan camera 770. The line scan camera may include a photodiode array. The line scan camera 770 can measure the intensity of the wavelength signals dispersed by the wavelength dispersion device 750 and can output the signal intensity according to the wavelength spectrum.

Each of FIG. 17 to FIG. 19 is an example wavelength dispersion-based ultrafast camera system to provide optical power correction.

Referring to FIG. 17, an ultrafast camera system 10e shown in FIG. 13 can measure optical spectrum information reflected at a sample, via a continuous timing detector 300d including a loop interferometer 310, a spectrum analyzer 700, and an optical switch 800. Here, an electrical pulse generator 200 shown in FIG. 3 may provide a reference signal to the loop interferometer 310, and a 3D imaging sensor head 400h may be combined.

The optical switch 800 included in the continuous timing detector 300d can receive a signal from one of the two output ports of the loop interferometer 310, and part of signal (for example, 5% tapped) before being input to the loop interferometer 310. The signal from either of the two output ports of the loop interferometer 310 may be, for example, an output of an electro-optic sampling based timing detector (EOS-TD). Part of signals before being input to the loop interferometer 310 may be power tapped signals.

The spectrum analyzer 700 receives the signal switched by the optical switch 800 and measures the intensity of the input signal in the optical spectrum. That is, upon receiving the output signal of the loop interferometer 310, the spectrum analyzer 700 can measure a signal intensity including time-of-flight change information (TOF signal intensity). Additionally, the spectrum analyzer 700 can measure the signal intensity before being input to the loop interferometer 310.

A computing device 900 receives the signal intensity measured by the spectrum analyzer 700. The computing device 900 may store reference power required for optical power correction, and may calculate a ratio between the reference power and the signal intensity before being input to the loop interferometer 310, as a correction value required for the optical power correction.

The computing device 900 may finally output the signal intensity whose sensitivity is calibrated by multiplying the correction value and the TOF signal intensity measured by the spectrum analyzer 700.

Referring to FIG. 18, an ultrafast camera system 10f shown in FIG. 14 can measure optical spectrum information reflected at a sample, via a continuous timing detector 300e including a loop interferometer 310 and two spectrum analyzers 700-1 and 700-2. Here, an electrical pulse generator 200 shown in FIG. 3 may provide a reference signal to the loop interferometer 310, and a 3D imaging sensor head 400h can be combined.

The spectrum analyzer 700-1 can receive a signal from either of the two output ports of the loop interferometer 310 and can measure the signal intensity including time-of-flight change information (TOF signal intensity).

The other spectrum analyzer 700-2 can receive part of signals (e.g., 5% tapped) before being input to the loop interferometer 310 and can measure the signal intensity before being input to the loop interferometer 310.

The computing device 900 may simultaneously obtain the signal intensity measured by each of the two spectrum analyzers 700-1 and 700-2. The computing device 900 may store reference power required for optical power correction, and may calculate the ratio between the reference power and the signal intensity measured by the spectrum analyzer 700-2, as a correction value required for optical power correction. The computing device 900 may finally output the signal intensity whose sensitivity is calibrated by multiplying the correction value and the TOF signal intensity measured by the spectrum analyzer 700-1.

Referring to FIG. 19, an ultrafast camera system 10f shown in FIG. 14 can measure optical spectrum information reflected at a sample, via a continuous timing detector 300e including a loop interferometer 310 and two spectrum analyzers 700-1 and 700-2. Here, a VCO 210 shown in FIG. 4 may provide a reference signal to the loop interferometer 310, and a 3D imaging sensor head 400h can be combined.

In the same manner as described above with reference to FIG. 18, the spectrum analyzer 700-1 can receive a signal from either of the two output ports of the loop interferometer 310 and can measure the signal intensity including time-of-flight change information (TOF signal intensity).

The other spectrum analyzer 700-2 can receive part of signals (e.g., 5% tapped) before being input to the loop interferometer 310 and can measure the signal intensity before being input to the loop interferometer 310.

The computing device 900 can simultaneously acquire the signal intensity measured by each of the two spectrum analyzers 700-1 and 700-2. The computing device 900 may store reference power required for optical power correction, and may calculate the ratio between the reference power and the signal intensity measured by the spectrum analyzer 700-2, as a correction value required for optical power correction. The computing device 900 may finally output the signal intensity whose sensitivity is calibrated by multiplying the correction value and the TOF signal intensity measured by the spectrum analyzer 700-1.

Figure 20:
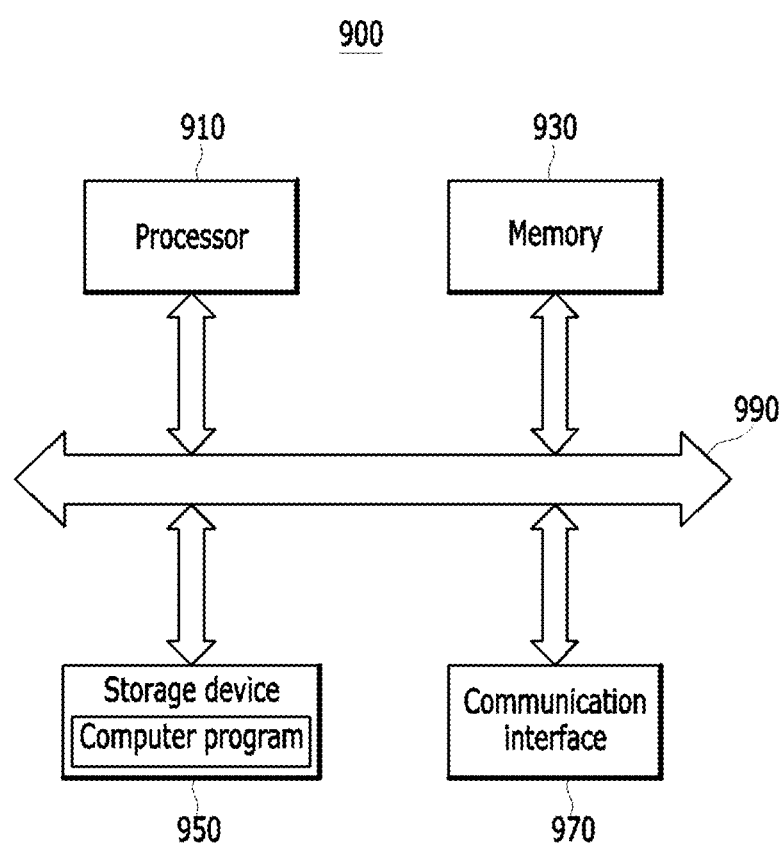
FIG. 20 is a configuration diagram of a computing device according to an embodiment.

FIG. 20 is a configuration diagram of a computing device according to an embodiment.

Referring to FIG. 20, a computing device 900 may include at least one processor 910, a memory 930 to load a computer program executed by the processor 910, a storage device 950 to store a computer program and various data, a communication interface 970 to transmit and receive data, and a bus to connect them. In addition, the computing device 900 may further include various elements.

The processor 910 is a device that controls the operation of the computing device 900 and may a processor of various types that processes instructions included in computer programs. For example, the processor may be configured to include at least one of a central processing unit (CPU), a micro processor unit (MPU), micro controller unit (MCU), a graphic processing unit (GPU) or any type of processor well-known in the art related to the present disclosure.

The memory 930 stores various data, instructions and/or information. The memory 930 may load a computer program from the storage device 950 so that instructions described to execute operations of the present disclosure are processed by the processor 910. The memory 930 may be, for example, a read only memory (ROM), a random access memory (RAM), or the like.

The storage device 950 may non-temporarily store computer programs and various data. The storage device 950 may be configured to include a non-volatile memory such as a read only memory (ROM), an erasable programmable ROM (EPROM), an electrically erasable programmable ROM (EEPROM), a flash memory, and the like, a hard disk, a removable disk, or any type of computer readable recoding medium well-known in the art related to the present disclosure.

The communication interface 970 may be a wired/wireless communication module supporting wired/wireless communication.

The bus 990 provides a communication function among elements of the computing device 900.

The computer program includes instructions executed by the processor 910 and is stored in a non-transitory computer readable storage medium. The instructions make the processor 910 to execute the operations of the present disclosure. The computer program may be downloaded via a network or sold in product form.

A structure such as a cantilever used in micro-electromechanical system (MEMS) has the first resonant frequency of several kHz or more. Sometimes the structure has the first resonant frequency of more than kHz according to the size. Further, the amplitude of movement is large and the movement speed is high. Thus, in the past, it was difficult to analyze the nonlinear movement of such a structure precisely. However, the ultrafast camera systems of the present disclosure can measure the movements or shape information of structures, such as a cantilever, with high speed and high resolution in real time.

In order to analyze the nonlinear movement of a 1D structure such as a cantilever or to accurately measure the shape of a semiconductor structure, a relatively long measurement distance performance of micrometers or more is required. In addition, in order to analyze the movements of a structure moving at high speed or to analyze a semiconductor structure with high speed, high resolution performance must be implemented at the time of high-speed measurement. Since an optical loop-based optical-microwave phase detector is used as a timing detector, the ultrafast camera systems of the present disclosure can have distance measurement performance of several millimeters or more and, at the same time, can achieve performance of a nanometer resolution at the high-speed measurement of kHz or more. Therefore, since the ultrafast camera systems of the present disclosure can support high-resolution measurement at high speed and have large maximum measurable distance, the nonlinear movement of structures can be observed in real time.

As the integrity of semiconductor devices has improved with the development of lithography technology, a technology to enable accurate and rapid inspection of integrated circuits with complicated patterns is required. Since the ultrafast camera systems of the present disclosure can measure the depth and shape of the semiconductor devices without damage, they can be used various semiconductor inspection processes. Further, the ultrafast camera systems of the present disclosure can be used to inspect small scratches made in the production process of various steel structures used for ships and automobiles. Through rapid and accurate defect inspection for the surface of steel structures, the corrosion of end product can be prevented and the durability thereof can be improved.

The ultrafast camera systems of the present disclosure can measure the 3D shape of a measurement target with high speed and high resolution in real time. When the ultrafast camera systems of the present disclosure are used for 3D shape measurement such as semiconductor processing and inspection, and surface measurement of a large diameter optical system, the scanning process can be significantly shortened compared to the conventional method for point-by-point measurement. Therefore, 3D shapes can be more rapidly measured.

Particularly, since the ultrafast camera systems 10e and 10f can collect at once optical spectrum information dispersed in the line direction, the movement of 1D structure or shape information can be measured faster than using limited sub-pulses. Since the ultrafast camera systems 10e and 10f can measure the movement or shape of a line at once without any separate beam scanning device, the configuration is simplified and the mechanical movement is reduced. Thus, the ultrafast camera systems 10e and 10f becomes less sensitive to alignment.

Since the ultrafast camera systems 10e and 10f can measure optical spectrum information in one-shot, very high speed measurement comparable to repetition rate of a laser can be achieved.

The ultrafast camera systems 10e and 10f can improve the spatial resolution by expanding the beam of the spectrum analyzer 700, or by increasing the density of the wavelength dispersion device 750 or the density of the photodiode array constituting the line scan camera 770. The ultrafast camera systems 10e and 10f can measure complicated structures smaller than the size of the beam by reducing the wavelength interval corresponding to the wavelength resolution. In the sensor head, the wavelength resolution can be dramatically improved by adjusting the magnification of the objective lens or the density of the wavelength dispersion device. As described above, since the size of the beam, a scanning method, and a measuring speed can be controlled, the ultrafast camera systems 10e and 10f can be extensively used for from shape measurement of fine semiconductor chips of the size of micrometers to scratch inspection of industrial steel structures.

The embodiments of the present disclosure described above are not implemented only through an apparatus and a method, but may be implemented through a program for realizing a function corresponding to the configuration of the examples of the present disclosure or a recording medium storing the program.

Although the embodiments of the present disclosure have been described in detail above, the scope of the present disclosure is not limited thereto, and various modifications and improvements by those skilled in the art using the basic concept of the present disclosure defined in the following claims belong to the scope of the present disclosure.

What is claimed is:

1. An ultrafast camera system comprising:
    a sensor head that injects an optical pulse train input from a pulsed laser onto a surface of a measurement target and outputs an optical signal reflected from the surface; and
    a timing detector that receives the optical signal whose time-of-flight is changed after passing through the sensor head and outputs an electrical signal corresponding to a timing error between the optical signal and a reference signal,
    wherein the timing detector modulates the optical signal using the reference signal in a loop where the optical signal is divided and then the divided signals circulate in different directions, and obtains an intensity difference of two interference signals which are generated from interference between the signals circulating the loop, through balanced photodetection, and
    wherein the intensity difference of the two interference signals is an electrical signal proportional to a timing error between the optical signal and the reference signal.

2. The ultrafast camera system of claim 1, wherein the sensor head performs high speed scanning of the input optical pulse train, injects the optical pulse train to plural points of the measurement target, and outputs the optical signal reflected from the plural points, through a beam scanner disposed in an optical path.

3. The ultrafast camera system of claim 1, wherein the sensor head generates sub-pulses by performing wavelength division on the input optical pulse train, injects the sub-pulses into different points of the measurement target, and outputs the optical signal obtained through multiplexing the sub-pulses reflected from the different points, through a wavelength division multiplexer displaced in an optical path.

4. The ultrafast camera system of claim 1, wherein the sensor head generates sub-pulses by wavelength-dividing the input optical pulse train, disperses the sub-pulses at an angle corresponding to wavelength using a wavelength dispersion device to inject the dispersed sub-pulses onto different points of the measurement target, and outputs the optical signal obtained by multiplexing the sub-pulses reflected from the different points, through a wavelength division multiplexer disposed in an optical path.

5. The ultrafast camera system of claim 1, wherein the timing detector is implemented with a fiber loop-based optical-microwave phase detector (FLOM-PD), a 3×3 coupler-based phase detector, or a balanced optical-microwave phase detector (BOM-PD).

6. The ultrafast camera system of claim 1, further comprising a reference signal source to output the reference signal synchronized with the pulsed laser,
    wherein the reference signal source comprises an electrical pulse generator that generates photocurrent pulses as the reference signal by performing photoelectric transformation on the optical pulse train of the pulsed laser, or a voltage-controlled oscillator that generates a microwave signal as the reference signal, which is frequency-locked by the optical pulse train of the pulsed laser.

7. The ultrafast camera system of claim 1, wherein the electrical signal output from the timing detector is proportional to a displacement of the measurement target or time-of-flight change.

8. The ultrafast camera system of claim 3, wherein the timing detector modulates the optical signal using the reference signal in a loop where the input optical signal is divided and then the divided signals circulate in different directions, wavelength-divides each of two interference signals generated from interference of the signals circulating the loop into corresponding channels, and outputs the electrical signal corresponding to a timing error of each sub-pulse via a balanced photodetector for each channel.

9. An ultrafast camera system comprising:
    a wavelength division multiplexer that generates sub-pulses by wavelength-dividing an optical pulse train output from a pulsed laser;
    a wavelength dispersion device to disperse the sub-pulses generated by the wavelength division multiplexer into different angles according to each wavelength of the sub-pulses;
    a lens that vertically injects the sub-pulses dispersed at an angle corresponding to wavelength by the wavelength dispersion device onto a measurement target;
    a timing detector that receives an optical signal obtained by multiplexing the sub-pulses reflected from points of the measurement target and outputs electrical signals corresponding to timing errors between a reference signal and sub-pulses included in the optical signal by using a plurality of balanced photodetectors; and
    a reference signal source to output the reference signal synchronized with the pulsed laser,
    wherein the sub-pulses reflected from the points on the measurement target are entered to the timing detector via the lens, the wavelength dispersion device, and the wavelength division multiplexer, and wherein the reference signal source comprises an electrical pulse generator that generates photocurrent pulses as the reference signal by performing photoelectric transformation on the optical pulse train of the pulsed laser, or a voltage-controlled oscillator that generates a microwave signal as the reference signal, which is frequency-locked by the optical pulse train of the pulsed laser.

10. The ultrafast camera system of claim 9, wherein the timing detector modulates the optical signal using the reference signal in a loop where the optical signal is divided and then the divided signals circulate in different directions, wavelength-divides each of two interference signals generated from interference of the signals circulating the loop into corresponding channels, and outputs an electrical signal corresponding to a timing error of each sub-pulse via a balanced photodetector for each channel.

11. An ultrafast camera system comprising:

a wavelength dispersion device to disperse an optical pulse train of a pulsed laser into a wavelength spectrum;

a lens that vertically injects continuous wavelength signal dispersed into the wavelength spectrum onto a measurement line;

a timing detector that receives an optical signal including the continuous wavelength signal reflected from the measurement line, and outputs a signal intensity in the wavelength spectrum, which is corresponding to a timing error between a reference signal and the continuous wavelength signal; and a reference signal source to output the reference signal synchronized with the pulsed laser, wherein the optical signal including the reflected continuous wavelength signal is entered to the timing detector via the lens and the wavelength dispersion device, and wherein the reference signal source comprises an electrical pulse generator that generates photocurrent pulses as the reference signal by performing photoelectric transformation on the optical pulse train of the pulsed laser, or a voltage-controlled oscillator that generates a microwave signal as the reference signal, which is frequency-locked by the optical pulse train of the pulsed laser.

12. The ultrafast camera system of claim 11, wherein the timing detector comprises a loop interferometer that modulates the optical signal using the reference signal in a loop where the optical signal is divided and the divided signals circulate in different directions, and outputs two interference signals generated from interference between the signals circulating the loop, an optical switch that alternately inputs the two interference signals to a spectrum analyzer, the spectrum analyzer that disperses each interference signal alternately entered from the optical switch, into the wavelength spectrum, and then measures an intensity of each dispersed continuous wavelength signal, and a computing device that outputs an intensity difference of two measurement signals measured by the spectrum analyzer during a switching period of the optical switch.

13. The ultrafast camera system of claim 11, wherein the timing detector comprises a loop interferometer that modulates the optical signal using the reference signal in a loop where the optical signal is divided and the divided signals circulate in different directions, and outputs two interference signals generated from interference between the signals circulating the loop, an optical switch that alternately inputs a first signal predetermined in the two interference signals and a second signal before being input to the loop interferometer, to a spectrum analyzer, the spectrum analyzer that alternately disperses the first signal and the second signal alternately entered from the optical switch, into the wavelength spectrum, and then measures an intensity of the dispersed first signal and the dispersed second signal respectively, and a computing device that calculates an optical power correction value being a ratio of a reference optical power and the intensity of the dispersed second signal measured by the spectrum analyzer, and corrects the intensity of the dispersed first signal with the optical power correction value.

14. The ultrafast camera system of claim 11, wherein the timing detector comprises a loop interferometer that modulates the optical signal using the reference signal in a loop where the optical signal is divided and the divided signals circulate in different directions, and outputs two interference signals generated from interference between the signals circulating the loop, a first spectrum analyzer that receives a first interference signal in the two interference signals, disperses the first interference signal into the wavelength spectrum, and measures an intensity of dispersed continuous wavelength signals, a second spectrum analyzer that receives a second interference signal in the two interference signals, disperses the second interference signal into the wavelength spectrum, and measures an intensity of the dispersed continuous wavelength signals, and a computing device that outputs an intensity difference between two measurement signals measured by the first spectrum analyzer and the second spectrum analyzer.

15. The ultrafast camera system of claim 11, wherein the timing detector comprises a loop interferometer that modulates the optical signal using the reference signal in a loop where the input optical signal is divided and the divided signals circulate in different directions, and outputs two interference signals generated from interference between the signals circulating the loop, a first spectrum analyzer that receives a first signal predetermined in the two interference signals, disperses the first signal into the wavelength spectrum, and measures an intensity of dispersed continuous wavelength signal, a second spectrum analyzer that receives a second signal before being input to the loop interferometer, disperses the second signal into the wavelength spectrum, and measures an intensity of dispersed continuous wavelength signals, and a computing device that calculates an optical power correction value being a ratio between a reference optical power and the intensity measured by the second spectrum analyzer, and corrects the intensity measured by the first spectrum analyzer with the optical power correction value.

16. The ultrafast camera system of claim 11, further comprising a beam scanner to move the measurement line to a direction vertical to the measurement line,
- wherein the timing detector outputs signal intensities of the measurement lines moved by the beam scanner, and
- wherein the signal intensities of the measurement lines are used for the 3D shape imaging of a measurement target.

17. The ultrafast camera system of claim 11, wherein the timing detector outputs the signal intensity in the wavelength spectrum, per measurement line.

18. The ultrafast camera system of claim 11, wherein the timing detector comprises at least one spectrum analyzer that disperses each input signal into the wavelength spectrum and then measures an intensity of dispersed continuous wavelength signal, and
- wherein the spectrum analyzer comprises a diffraction lattice and a line scan camera.

* * * * *